US011541584B1

(12) United States Patent
Quinonez

(10) Patent No.: US 11,541,584 B1
(45) Date of Patent: Jan. 3, 2023

(54) 3D PRINTED INJECTION SIDE OF A MULTI-PIECE MOLD WITH INTERNAL THERMAL MANIFOLD

(71) Applicant: Kemeera Inc., Oakland, CA (US)

(72) Inventor: Carlo Quinonez, Oakland, CA (US)

(73) Assignee: Kemeera Inc., Oakland, CA (US)

( * ) Notice: Subject to any disclaimer, the term of this patent is extended or adjusted under 35 U.S.C. 154(b) by 648 days.

(21) Appl. No.: 15/693,377

(22) Filed: Aug. 31, 2017

Related U.S. Application Data

(60) Provisional application No. 62/383,278, filed on Sep. 2, 2016.

(51) Int. Cl.
| | |
|---|---|
| *B29C 45/27* | (2006.01) |
| *B29C 33/38* | (2006.01) |
| *B29C 64/124* | (2017.01) |
| *B33Y 10/00* | (2015.01) |
| *B33Y 80/00* | (2015.01) |
| *B29K 63/00* | (2006.01) |
| *B29L 31/00* | (2006.01) |

(52) U.S. Cl.
CPC ...... *B29C 45/2738* (2013.01); *B29C 33/3842* (2013.01); *B29C 64/124* (2017.08); *B33Y 10/00* (2014.12); *B33Y 80/00* (2014.12); *B29K 2063/00* (2013.01); *B29L 2031/757* (2013.01)

(58) Field of Classification Search
CPC . B29C 45/26; B29C 45/2738; B29C 45/2737; B29C 45/3842; B29C 33/3842; B29C 33/385; B29C 33/3857; B33Y 10/00; B33Y 30/00; B33Y 80/00; B29L 2031/757; B29K 2065/00
See application file for complete search history.

(56) References Cited

U.S. PATENT DOCUMENTS

| | | | | |
|---|---|---|---|---|
| 3,647,337 A | * | 3/1972 | Dega .................. | B29C 45/02 425/589 |
| 3,797,980 A | * | 3/1974 | Budahn ............... | A01J 25/13 425/84 |
| 4,370,122 A | * | 1/1983 | Dannels ............ | B29C 45/2735 264/328.7 |

(Continued)

OTHER PUBLICATIONS

U.S. Appl. No. 15/813,050, filed Nov. 14, 2017, U.S. Pat. No. 10,821,633, Nov. 3, 2020.

(Continued)

*Primary Examiner* — Seyed Masoud Malekzadeh
(74) *Attorney, Agent, or Firm* — Haynes Beffel & Wolfeld, LLP; Ernest J. Beffel, Jr.

(57) ABSTRACT

We disclose a component of an injection molding tool that includes a one piece side of a mold built up by additive manufacturing using a polymer, the side of the mold defining part of an injection cavity. The side of the mold further includes an injection port coupled to the injection cavity and a heating fluid manifold separated from the injection cavity by a heat transfer wall. The heat transfer wall is reinforced against pressure in the injection cavity by a backing of engineered supports. Inlet and outlet ports are coupled to the heating fluid manifold, configured to channel a thermally conductive fluid into and out of the heating fluid manifold. Additional additive manufacturing features and material properties are described. Complementary methods of manufacturing also are disclosed.

14 Claims, 15 Drawing Sheets

(56) References Cited

U.S. PATENT DOCUMENTS

| | | | |
|---|---|---|---|
| 6,310,333 B2* | 10/2001 | Shibata | B29C 45/2738 |
| | | | 219/676 |
| 6,701,997 B2* | 3/2004 | Gellert | C23C 26/00 |
| | | | 164/95 |
| 7,040,378 B2* | 5/2006 | Gellert | B22F 7/062 |
| | | | 164/312 |
| 9,365,418 B2* | 6/2016 | Quinonez | F04B 43/043 |
| 9,902,089 B2* | 2/2018 | Halford | B29C 35/0288 |
| 10,076,860 B2* | 9/2018 | Jenko | B29C 45/278 |
| 10,933,565 B2* | 3/2021 | Halford | B29C 35/0294 |
| 2004/0079511 A1* | 4/2004 | Gellert | B29C 45/2737 |
| | | | 164/312 |
| 2005/0214173 A1* | 9/2005 | Facer | C30B 7/00 |
| | | | 422/400 |
| 2007/0166199 A1* | 7/2007 | Zhou | G01N 1/28 |
| | | | 422/400 |
| 2009/0178934 A1* | 7/2009 | Jarvius | B29C 66/5412 |
| | | | 205/777.5 |
| 2014/0178518 A1* | 6/2014 | Cook | B29C 45/2675 |
| | | | 425/183 |
| 2014/0220173 A1* | 8/2014 | Quinonez | B29C 45/401 |
| | | | 425/546 |
| 2014/0367889 A1* | 12/2014 | Halford | B29C 35/0288 |
| | | | 264/319 |
| 2016/0039120 A1 | 2/2016 | Dikovsky et al. | |
| 2016/0067928 A1 | 3/2016 | Mark et al. | |
| 2016/0082629 A1* | 3/2016 | Modi | B29C 45/1618 |
| | | | 264/28 |
| 2016/0193768 A1* | 7/2016 | Jenko | B23P 15/007 |
| | | | 419/53 |
| 2016/0346831 A1* | 12/2016 | Snyder | B33Y 10/00 |
| 2017/0043518 A1* | 2/2017 | Narayanaswamy | B22F 5/007 |
| 2017/0197337 A1* | 7/2017 | Liu | B33Y 80/00 |
| 2018/0210984 A1* | 7/2018 | Herzog | B22F 10/20 |
| 2018/0319077 A1* | 11/2018 | Blanchet | B29D 30/0606 |

OTHER PUBLICATIONS

Anonymous, The RMA Rubber Handbook, The Rubber Manufacturers Association, Inc. dated 2005, 66 pages.

Dawson et al., Heat Transfer in Polymers, National Physical Laboratory, dated Oct. 25, 2006, 35 pages.

Anonymous, Plastics-Thermal Conductivity Coefficients, The Engineering ToolBox, retrieved on Jun. 21, 2022, 1 page. Retrieved from the internet [URL: https://www.engineeringtoolbox.com/thermal-conductivity-plastics-d_1786.html].

Anonymous, Metals, Metallic Elements and Alloys—Thermal Conductivities, The Engineering ToolBox, retrieved on Jun. 21, 2022, 7 pages. Retrieved from the internet [URL: https://www.engineeringtoolbox.com/thermal-conductivity-metals-d_858.html].

Young et al., University Physics with Modern Physics 13th Edition, Chapter 17 Temperature and Heat, dated 2012, pp. 551-589, 46 pages.

Anonymous, D5930-17—Standard Test Method for Thermal Conductivity of Plastics by Means of a Transient Line-Source Technique, ASTM International, retreived on Jun. 28, 2022, 5 pages.

* cited by examiner

Accura Bluestone

| 1mm Pressure | 40 C Deflection |
|---|---|
| 50 | 0.01611 |
| 100 | 0.01554 |
| 200 | 0.01442 |
| 800 | 0.007836 |

| 2mm Pressure | 40 C Deflection |
|---|---|
| 50 | 0.01048 |
| 100 | 0.01008 |
| 200 | 0.009288 |
| 800 | 0.004802 |

| 3mm Pressure | 40 C Deflection |
|---|---|
| 50 | 0.008321 |
| 100 | 0.008053 |
| 200 | 0.007369 |
| 800 | 0.003916 |

| 4mm Pressure | 40 C Deflection |
|---|---|
| 50 | 0.007592 |
| 100 | 0.007424 |
| 200 | 0.007369 |
| 800 | 0.003799 |

| 1mm Pressure | 60 C Deflection |
|---|---|
| 50 | 0.03278 |
| 100 | 0.03221 |
| 200 | 0.03108 |
| 800 | 0.02437 |

| 2mm Pressure | 60 C Deflection |
|---|---|
| 50 | 0.02137 |
| 100 | 0.02097 |
| 200 | 0.02017 |
| 800 | 0.01544 |

| 3mm Pressure | 60 C Deflection |
|---|---|
| 50 | 0.01696 |
| 100 | 0.01664 |
| 200 | 0.016 |
| 800 | 0.01227 |

| 4mm Pressure | 60 C Deflection |
|---|---|
| 50 | 0.01546 |
| 100 | 0.01518 |
| 200 | 0.01463 |
| 800 | 0.0114 |

| 1mm Pressure | 80 C Deflection |
|---|---|
| 50 | 0.04945 |
| 100 | 0.04888 |
| 200 | 0.04775 |
| 800 | 0.04104 |

| 2mm Pressure | 80 C Deflection |
|---|---|
| 50 | 0.03225 |
| 100 | 0.03185 |
| 200 | 0.03105 |
| 800 | 0.02629 |

| 3mm Pressure | 80 C Deflection |
|---|---|
| 50 | 0.02561 |
| 100 | 0.02528 |
| 200 | 0.02464 |
| 800 | 0.02086 |

| 4mm Pressure | 80 C Deflection |
|---|---|
| 50 | 0.02333 |
| 100 | 0.02306 |
| 200 | 0.0225 |
| 800 | 0.01922 |

FIG. 13

Carbon 3D CE 220

| 1mm | 40 C | | 2mm | 40 C | | 3mm | 40 C | | 4mm | 40 C |
|---|---|---|---|---|---|---|---|---|---|---|
| Pressure | Deflection | | Pressure | Deflection | | Pressure | Deflection | | Pressure | Deflection |
| 50 | 0.02151 | | 50 | 0.01387 | | 50 | 0.01095 | | 50 | 0.009985 |
| 100 | 0.01927 | | 100 | 0.01293 | | 100 | 0.0131 | | 100 | 0.009526 |
| 200 | 0.01771 | | 200 | 0.0118 | | 200 | 0.008803 | | 200 | 0.008117 |
| 800 | 0.004459 | | 800 | 0.003588 | | 800 | 0.003473 | | 800 | 0.003346 |

| 1mm | 60 C | | 2mm | 60 C | | 3mm | 60 C | | 4mm | 60 C |
|---|---|---|---|---|---|---|---|---|---|---|
| Pressure | Deflection | | Pressure | Deflection | | Pressure | Deflection | | Pressure | Deflection |
| 50 | 0.04428 | | 50 | 0.02864 | | 50 | 0.02263 | | 50 | 0.0206 |
| 100 | 0.04301 | | 100 | 0.02774 | | 100 | 0.0219 | | 100 | 0.01997 |
| 200 | 0.04048 | | 200 | 0.02593 | | 200 | 0.02046 | | 200 | 0.01871 |
| 800 | 0.02544 | | 800 | 0.01544 | | 800 | 0.01219 | | 800 | 0.01155 |

| 1mm | 80 C | | 2mm | 80 C | | 3mm | 80 C | | 4mm | 80 C |
|---|---|---|---|---|---|---|---|---|---|---|
| Pressure | Deflection | | Pressure | Deflection | | Pressure | Deflection | | Pressure | Deflection |
| 50 | 0.06706 | | 50 | 0.04342 | | 50 | 0.0343 | | 50 | 0.03122 |
| 100 | 0.06579 | | 100 | 0.04251 | | 100 | 0.03358 | | 100 | 0.03059 |
| 200 | 0.059 | | 200 | 0.04025 | | 200 | 0.03242 | | 200 | 0.02263 |
| 800 | 0.0481 | | 800 | 0.03001 | | 800 | 0.02362 | | 800 | 0.02193 |

FIG. 14

3D PRINTED INJECTION SIDE OF A MULTI-PIECE MOLD WITH INTERNAL THERMAL MANIFOLD

CROSS-REFERENCE TO RELATED APPLICATIONS

This application claims the benefit of U.S. Provisional Pat. Application Ser. No. 62/383,278, entitled "3D PRINTED INJECTION SIDE OF A MULTI-PIECE MOLD WITH INTERNAL THERMAL MANIFOLD," filed Sep. 2, 2016, the disclosure of which is incorporated by reference herein in its entirety.

FIELD OF THE INVENTION

The technology disclosed relates to tooling for injection molding, and more particularly to the molding of liquid silicone rubber, a thermosetting material cured by heating.

BACKGROUND OF THE INVENTION

Silicone rubber is used in major industries, including consumer products, automotive, medical, scientific, aerospace, construction, and electronics. Among its many properties are mechanical stability and flexibility over wide temperature ranges, resistance to breakdown from ultraviolet energy and radiation, biocompatibility, excellent chemical resistance, high purity without plasticizers or organic additives, ability to hold tight tolerances and optical transparency.

The thousands of silicone rubber formulations can be divided into two basic categories: high consistency rubber (HCR) and liquid silicone rubber (LSR). One difference between these categories is that HCR has high viscosity and the consistency of thick putty; LSR has a lower viscosity, which allows it to "flow" as a thick liquid, suitable for injection molding. Production grade HCR and LSR are both heat cured to increase the cross-linking between the polymer chains and yield a stronger, more durable product. Some formulations of LSR can be cured by room temperature vulcanizing (RTV) which requires a much longer cure time and does not yield a product comparable to heat cured HCR or LSR.

Liquid silicone rubber is typically molded in precision-machined heated metal molds. These molding tools are used in an injection molding machine that operates at pressures that can often exceed 1000 pounds per square inch (psi). Consequently, the molds are expensive and labor intensive to design and build, often taking several days or weeks to complete. This severely limits the practicality of making multiple design changes to refine the end product or the mold itself. While suitable for large manufacturing runs of thousands of parts, conventional injection molding machines with metal molds cannot provide a cost effective, timely solution to the problem of producing small quantities of silicone rubber parts where fast turnaround time and the ability to quickly iterate designs and try multiple design variations are paramount.

Thus, an opportunity arises to improve the molding technology for small quantities of liquid silicone rubber parts and achieve rapid time to delivery of a first part and prototypes made of the same production material to be used in the final product, while obviating the need for expensive injection molding machines and metal molds.

SUMMARY

We disclose a component of an injection molding tool that includes a one piece side of a mold built up by additive manufacturing using a polymer, the side of the mold defining part of an injection cavity. The side of the mold further includes an injection port coupled to the injection cavity and a heating fluid manifold separated from the injection cavity by a heat transfer wall. The heat transfer wall is reinforced against pressure in the injection cavity by a backing of engineered supports. Inlet and outlet ports are coupled to the heating fluid manifold, configured to channel a thermally conductive fluid into and out of the heating fluid manifold. Additional additive manufacturing features and material properties are described. Complementary methods of manufacturing are also disclosed.

The above summary is provided in order to provide a basic understanding of some aspects of the technology disclosed. This summary is not intended to identify key or critical elements of the technology disclosed or to delineate the scope of the technology disclosed. Its sole purpose is to present some concepts of the technology disclosed in a simplified form as a prelude to the more detailed description presented below. Particular aspects of the technology disclosed are described in the claims, specification and drawings.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIGS. 12, 13 and 14 show simulation data at various temperatures and pressures for three different polymers used to 3D print the injection molding tools in the technology disclosed.

DETAILED DESCRIPTION

Figure 1:
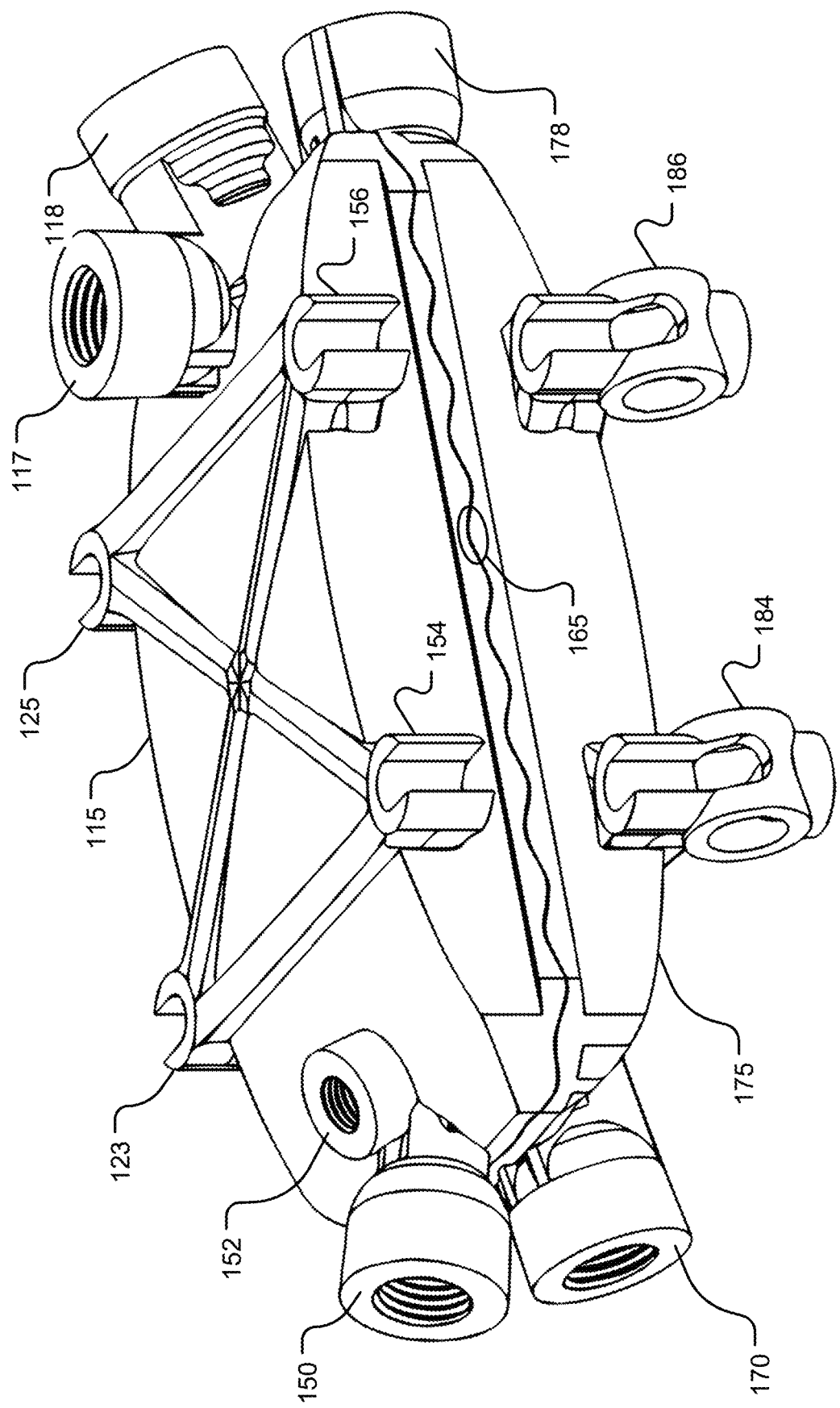
FIG. 1 shows an example two-sided mold in its fully assembled configuration.

The following description is presented with reference to the figures to enable any person skilled in the art to make and use the technology disclosed, and is provided in the context of particular applications and their requirements. Various modifications and equivalent variations to the disclosed embodiments will be readily apparent to those skilled in the art, and the general principles defined herein may be applied to other embodiments and applications without departing from the spirit and scope of the disclosure. Thus, the technology disclosed is not intended to be limited to the embodiments shown, but is to be accorded with the widest scope consistent with the principles and features disclosed herein.

Unless otherwise stated, in this application specified relationships, such as parallel to, aligned with, or in the same plane as, mean that the specified relationships are within limitations of manufacturing processes and within manufacturing variations. Additionally, terms such as top, bottom, left, right, rear, front, below, above may be used in the description and claims to aid understanding of the technology disclosed and not used in a limiting sense. Like elements in various embodiments are commonly referred to with like reference numerals.

Overview

Simple injection molding tools are comprised of two pieces or sides that form an internal mold cavity when clamped together. At least one side includes an injection port into the mold cavity through which the material to be molded is injected. At least one vent or exhaust port is also included to allow trapped air and volatile gases to escape as molding material is injected. Without a vent, trapped air and gases are compressed and can cause defects in the molded part. Molding tools may also comprise multiple pieces with multiple injection ports. This disclosure describes technology that can be applied to one or more pieces or sides of a molding tool. However, for ease of comprehension the technology disclosed is described with respect to a single side of a simple two-part mold.

The technology disclosed solves the problem of rapidly molding and delivering small quantities of production grade liquid silicone rubber parts which have material properties suitable for mass produced products. The solution is a one-piece side of an injection molding tool that incorporates an integral thermal manifold for heating and cooling an adjacent mold cavity. The mold cavity is separated from the thermal manifold by a heat transfer wall formed by at least one surface of the thermal manifold. A thermally conductive fluid is introduced into the thermal manifold to heat or cool the mold cavity, as appropriate for the silicone rubber and process being used. The mold itself is made using a 3D printing process.

3D printing is an additive manufacturing technology that allows a part to be built up in a selective fashion. This is often done layer-by-layer with each successive layer bonded to the previous layer. In some 3D printers, parts can be built up piecemeal within a volume of liquid resin or sintered material that is selectively cured using ultraviolet light or other energy sources such as a laser beam or electron beam.

Thus, a 3D printed part is effectively manufactured as one-piece. This provides several advantages including: the ability to combine several small parts or subassemblies into one integrally manufactured component, maintaining consistent and accurate alignment between subassemblies that would otherwise need to be aligned and joined to each other, allowing voids and cavities to be designed into components without the need to remove material to create them, allowing embedded holes or structures of any cross section or shape to be integrally included wherever desired within a part and avoiding the need to remove and possibly waste material as in conventional subtractive manufacturing processes.

3D printing can be used to produce a side of an injection mold incorporating an internal thermal manifold as one piece. 3D printing may also be used to produce separate subassemblies that can be fused or otherwise joined together to form a one-piece injection mold with internal thermal manifold. This is possible since 3D printed parts are usually made of polymer-based materials that can be seamlessly joined by melting, solvent welding, specialized glues and other similar processes to form integral one-piece parts.

3D printed material can also be used to "overmold" another material as when a hard core material is overmolded with a softer material to form a cushioned grip. In another example, a core component may be overmolded with a thicker layer of material to reinforce it, seal it or incorporate other design features.

We disclose using 3D printing technology to produce a one-piece side of a multi-part injection mold. 3D printing technology allows a thermal manifold to be built into a chamber adjacent to the mold cavity but separated by a heat transfer wall. The chamber is reinforced with engineered supports which serve two primary purposes: firstly, to strengthen the heat transfer wall and limit or eliminate any plastic deformation which could occur as the mold cavity is pressurized and heated, and secondly to facilitate non-laminar flow of thermally conductive fluid through the manifold formed by the chamber. The thermal fluid may be pressurized and circulated in a continuous loop using an external pump and reservoir.

Non-laminar flow is also known as turbulent flow because it breaks up the layers of a fluid and causes mixing, which in turn increases the thermal transfer between the fluid and the heat transfer wall. This is useful because the polymers used to form the heat transfer wall are effectively insulators.

In this disclosure, an additive manufacturing polymer that is effectively an insulator refers to a polymer or modified polymer with a thermal conductivity coefficient (k) in a range of 0.10 to 1.0 or 5.0 or 10.00 W/(m·K). See, e.g., The Engineering ToolBox <accessed on Aug. 21, 2016 at http://www.engineeringtoolbox.com/thermal-conductivity-plastics-d_1786.html>(0.17 to 0.50 for pure polymers). We use a wider coefficient range in this application than the range for pure polymers because modifiers are available to increase the conductivity of polymers. Specifying a broader range of thermal conductivity for additive manufacturing polymers covers modifications to manufacturing materials. Modifiers can increase the thermal conductivity of additive manufacturing polymers. Measurement of thermal conductivity coefficients for materials, as opposed to tooling that has been additively manufactured from the materials, is standardized in ASTM D 5930-01, Test Method for Thermal Conductivity of Plastics by Means of a Transient Line-Source Technique, which is part of the ISO 22007 series. See, Angela Dawson, Martin Rides, Crispin Allen, Heat Transfer in Polymers, slide 25 (Oct. 25, 2006) <accessed on Aug. 21, 2016 at http://resource.npl.co.uk/materials/polyproc/iag/october2006/06_mpp71_iag9_25oct06_v3.pdf>; ASTM D5930 2001 Standard Test Method for Thermal Conductivity of Plastics by Means of a Transient Line-Source Technique <accessed at ftp://185.72.26.245/Astm/2/01/Section%2008/ASTM0803/PDF/D5930.pdf>. A variety of measurement techniques generate results that readily distinguish polymers that are effectively insulators from metals, from which molds traditionally have been machined, because the coefficients are so different. See, e.g., The Engineering ToolBox <accessed on Aug. 21, 2016 at http://www.engineeringtoolbox.com/thermal-conductivity-metals-d_858.html>(204-249 for pure aluminum, 29-54 for carbon steel, 12-45 stainless steel); Young and Freedman, University Physics with Modern Physics, table 17.5, p. 571 ($13^{th}$ Ed. 2012)<accessed on Aug. 21, 2016 at http://faculty.ccri.edu/joallen/M2990/University%20Physics%20with%20Modern%20Physics,%2013th %20Edition.pdf>(comparing metals with solids and gasses).

Injection mold tooling produced using the technology disclosed, being 3D printed, can be manufactured rather quickly compared to making a traditional metal mold. Once made, such molds can be put into service without the need for a large and expensive injection molding machine, simply by connecting it to a suitable source of thermally conductive fluid and a source of liquid silicone rubber (LSR) for injection. A first part can then be rapidly produced. It can then be assessed and if it meets the desired specifications, it can be tested, used or delivered as a prototype. Additional parts can then easily be made using the same mold. This is useful for short production or prototype runs.

The technology disclosed operates at significantly lower pressures and temperatures as compared to a conventional injection molding machine and is useful for producing small quantities of parts in thermosetting materials that do not exceed the capabilities of the 3D printing polymers used to manufacture the injection molding tool.

Examples of typical 3D printing polymers include Accura® PEAK™ (3D Systems Corp.), Accura® Bluestone™ (3D Systems Corp.) and Carbon CE220™ resin (Carbon 3D, Inc.). A brief overview of these materials follows.

Accura® PEAK™ is an epoxy based photopolymer liquid resin for use with SLA™ (stereolithography) 3D printers. It has a glass transition temperature of 80-90 degrees C. and specified HDT (heat deflection temperature) ratings ranging from 59 to 124 degrees C. depending on post cure and testing conditions. It is characterized as a stiff plastic material for heat resistant components.

Accura® Bluestone™ is an epoxy based photopolymer liquid resin for use with SLA™(stereolithography) 3D printers. It has a glass transition temperature of 71-81 degrees C. and specified HDT (heat deflection temperature) ratings ranging from 65 to 284 degrees C. depending on post cure and testing conditions. It is characterized as a heat and abrasion resistant composite material for manufacturing stable, high stiffness parts.

Carbon CE220™ is a cyanate ester based photopolymer liquid resin for use with Carbon 3D printers. These printers use a form of 3D printing technology called Continuous Liquid Interface Processing (CLIP) that is based on digital light processing (DLP) technology. Carbon CE220™ has a glass transition temperature of 175-220 degrees C. and specified HDT (heat deflection temperature) ratings ranging from 191 to 219 degrees C. depending on testing conditions. It is characterized as a high strength material for manufacturing thermally stable high stiffness parts for use at elevated temperatures.

Based on the HDT (heat deflection temperature) ratings of these materials, all are suitable for 3D printing the injection molding tools described in this disclosure. The HDT is a practical measurement under specified test conditions (loading and temperature) which gives an indication of how a material will withstand elevated temperatures and deform as temperature increases. Glass transition temperatures are also specified for polymers but these are not uniform throughout a polymer material. The glass transition temperature is the temperature at which a crystalline or semi-crystalline portion of a polymer material undergoes a transition from a hard or rigid "glassy" state to a soft and pliable rubber-like state.

Since synthetic polymers can comprise a mix of ordered, crystalline domains and random amorphous areas with no regular structure, glass transition may not occur uniformly throughout a polymer. Thus, glass transition temperatures for different materials are not directly comparable. However, HDT's are based on standard test conditions and thus are comparable for different materials. Therefore, HDT's are typically used when selecting a polymer material for a particular application.

For use in fabricating the injection mold tooling disclosed herein, the given HDT ratings of the above polymers offer a practical range of operating temperature for use in curing liquid silicone rubber. This enables the rapid manufacturing of prototype parts that are made of the same liquid silicone rubber material as the final production parts. Additionally, the use of these polymers with the technology disclosed permits cost effective and timely production of limited quantity production parts where only a few are needed.

FIGURES

FIG. 1 shows an example of a two-sided injection molding tool in its assembled configuration. A silicone rubber watchband 502 is apparent in FIG. 5 and is used throughout the figures for consistency. The technology disclosed also can be applied to three part and more complex injection molds. The top side 115 in FIG. 1 meshes with the bottom side 175 via interlocking scalloped surfaces 165 that extend fully around the circumference of both pieces. The scalloped surfaces used to align the top and bottom sides of the mold are contoured based. As illustrated, these surfaces are scalloped according to a parametric equation comprising one or more sinusoidal curves. A general formula for this type of surface is:

$$z=\sin(x)+\sin(y)$$

Scale factors are added to this to stretch and compress the surface, to achieve the desired interface surface for the molding tool.

In FIG. 1 the sinusoidal nature of the interlocking scalloped surfaces 165 is visible as a sinusoidal curve at the interface where they meet on the perimeter of the mold. Likewise, in FIG. 8C an exploded view shows this sinusoidal curve at the intersection of faces 822 and 823 from the top 115 and bottom 175 mold sides respectively. Orthogonal to faces 822 and 823, a portion of another sinusoidal curve is visible between edges 813 and 814, again from the top 115 and bottom 175 mold sides respectively.

In contrast, conventional metal injection mold sides are able to use alignment pins: basically, these are rods that fit into mating holes on either side of a mating surface formed between mold sides when they are assembled. Typically only a few alignment pins are needed for metal molds because metal is more rigid and less subject to plastic deformation as compared to the polymer materials used in 3D printing. However, alignment pins are less than ideal for molds made from polymer material, even if the number of pins is increased. One reason is that the pins localize the alignment forces and may not effectively limit the plastic deformation between such alignment pins.

A more practical and effective approach to limit plastic deformation in polymer molds is to design continuous mating features into the mold sides. This also helps to more evenly distribute the compressive forces, which obtain when mold sides are clamped together. In this example, a repeating pattern of interlocking sinusoidal curves is employed for this purpose.

In other embodiments, other curves and interlocking shapes may be used. For instance, interlocking "V" shapes like triangles, semicircles, irregular curves incorporating flat surfaces as well, etc. The use of continuous interlocking surfaces increases overall alignment accuracy and maintains the alignment of individual mold sides with each other by limiting plastic deformation that may occur as clamping force is applied to the mold pieces when they are assembled. Those skilled in the art will be familiar with a variety of other such patterns and variations that can be used.

The top 115 and bottom 175 sides of the mold are each manufactured in one piece using 3D printing technology, an additive manufacturing technology that allows a component to be built up in layers. Specifically owing to this layer-by-layer buildup of material with each layer fused to the previous, it is possible to incorporate voids containing engineered structures having virtually any shape within the interior of a component. It is this unique capability of 3D printing that makes it possible to cost effectively design and build one-piece mold sides that incorporate their own thermal manifolds to heat and cool the mold cavity, thus eliminating the need for expensive metal molds and large, high-pressure injection machines.

Each side of the injection mold includes an input port 150 and 170 for the introduction of a thermally conductive fluid into an interior manifold, containing engineered supports, for the heating and cooling of the mold cavity, and an exit port 117 and 178 for the fluid. In this example, the top side 115 also incorporates an inlet 152 for the material to be molded and a corresponding vent 118 at the far side of the mold cavity. The inlet 152 and the vent 118 are built into the top side during the layer-by-layer fabrication process and are isolated from the thermal manifold. The inlet 152 passes right through the thermal manifold as shown in the longitudinal section in FIG. 2.

The top and bottom mold sides 115 and 175 additionally incorporate matching hold-downs 154 and 184, 156 and 186 as shown on the front faces in FIG. 1. These are used to clamp the mold sides together. The top hold-downs 123 and 125 are also shown for the rear face of the top side 115. When both sides are clamped together, the interlocking scalloped surfaces 165 distribute the pressure evenly around the circumference of the mold and maintain both sides in alignment.

Figure 2:
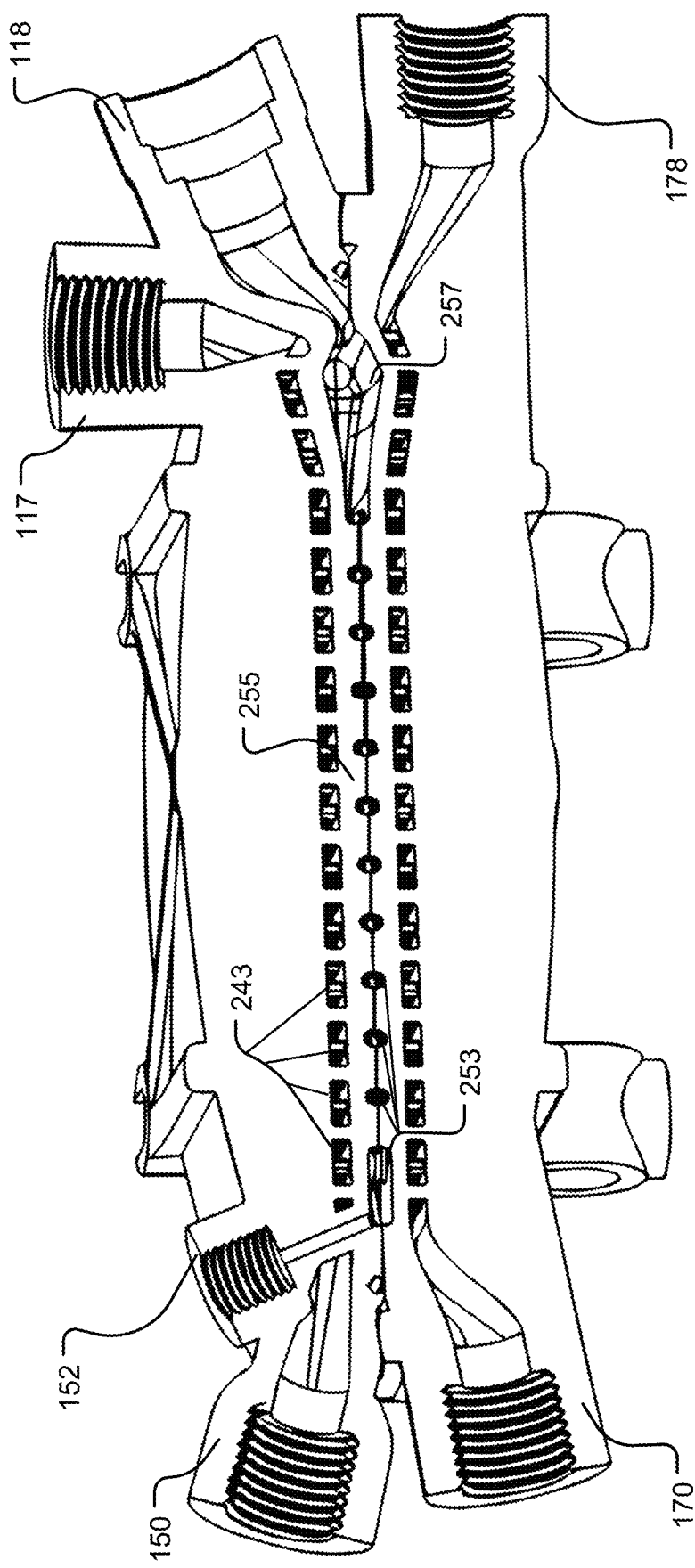
FIG. 2 shows a longitudinal section through the center of the fully assembled mold in FIG. 1. The orientation is the same as in FIG. 1, with the inputs to the left side of the drawing.
Figure 3:
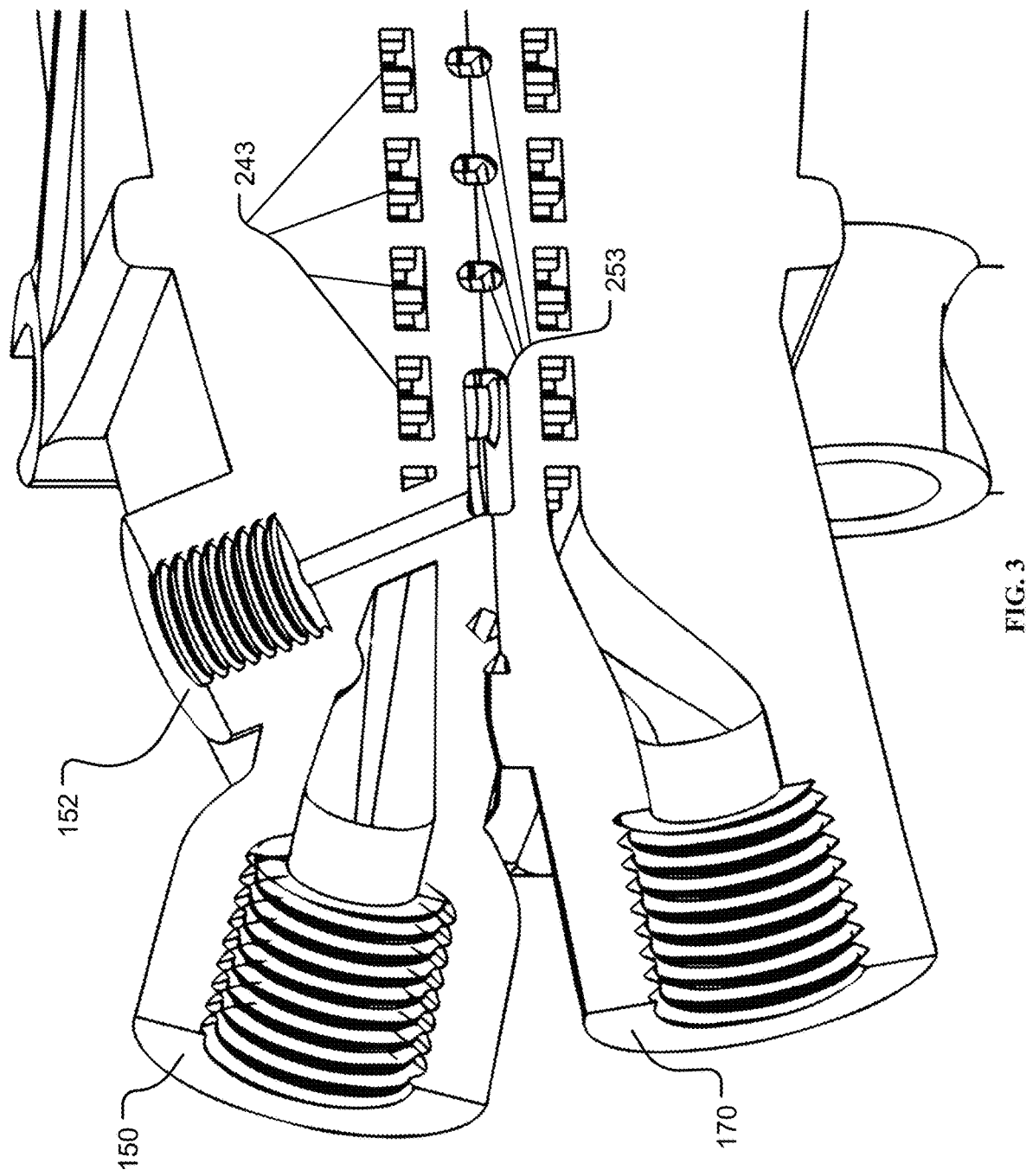
FIG. 3 shows an enlarged view of the input side of FIG. 2 with the engineered supports exposed. The orientation is the same as in FIG. 1, with the inputs to the left side of the drawing.
Figure 5:
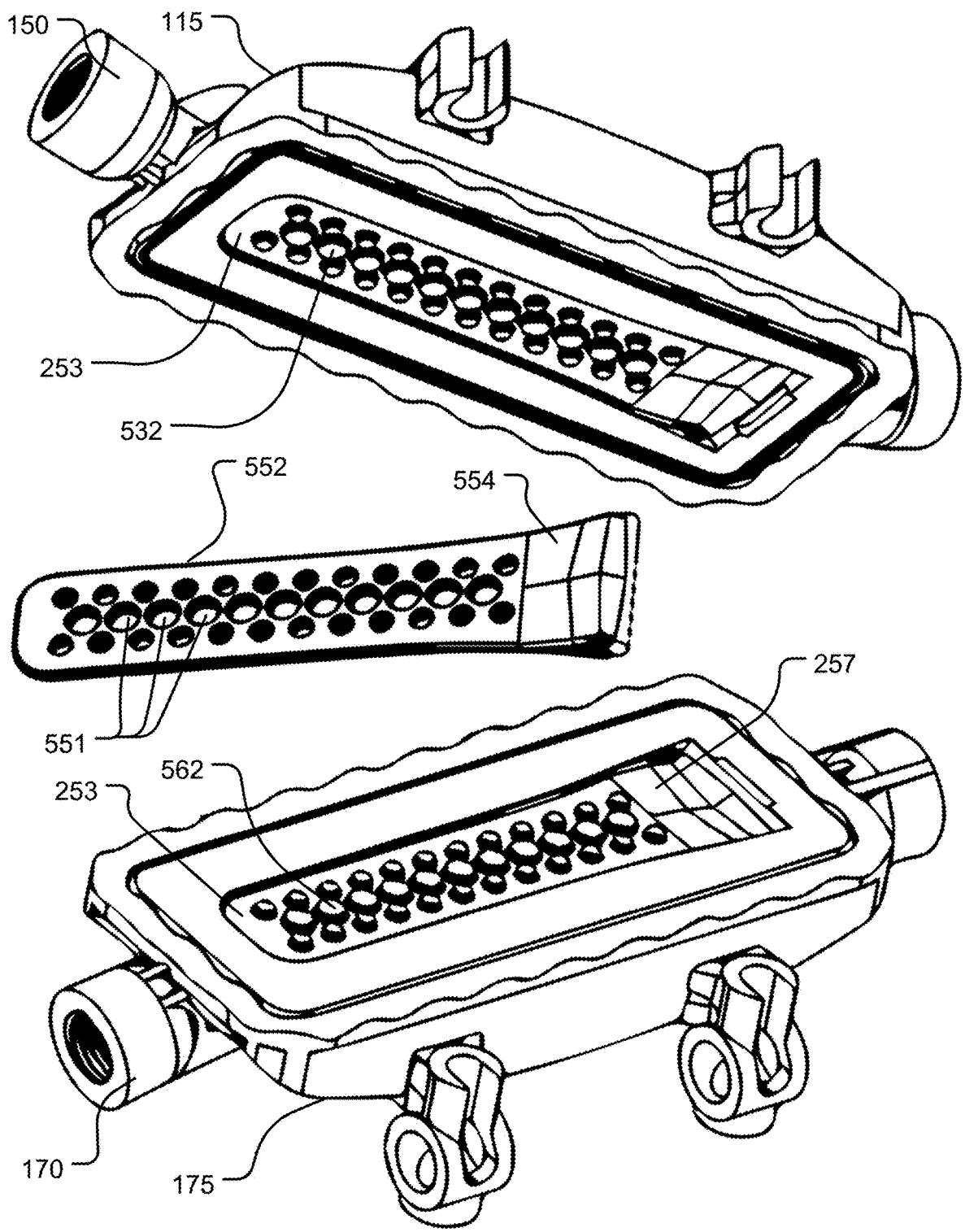
FIG. 5 shows an exploded view of FIG. 1 with the molded part, a watchband, shown in the center.

FIG. 2 shows a longitudinal section through the assembled mold shown in FIG. 1. Engineered supports 243, which are columns in the illustrated design, are visible in a thermal manifold that is fed from port 150 and separated from the mold cavity 253 by a heat transfer wall 255. A similar thermal manifold and heat transfer wall is incorporated into the bottom side of the mold and fed through port 170 with a thermally conductive fluid. FIG. 3 is an enlarged view of the left side of FIG. 2 that shows the engineered supports 243 and portions of the mold cavity 253. The larger opening 257 in the mold cavity as shown in FIG. 2 is for a thicker portion of the watchband that attaches to a watch casing. FIG. 5 shows the completed watchband 552 with this thicker mounting portion 554.

Figure 4:
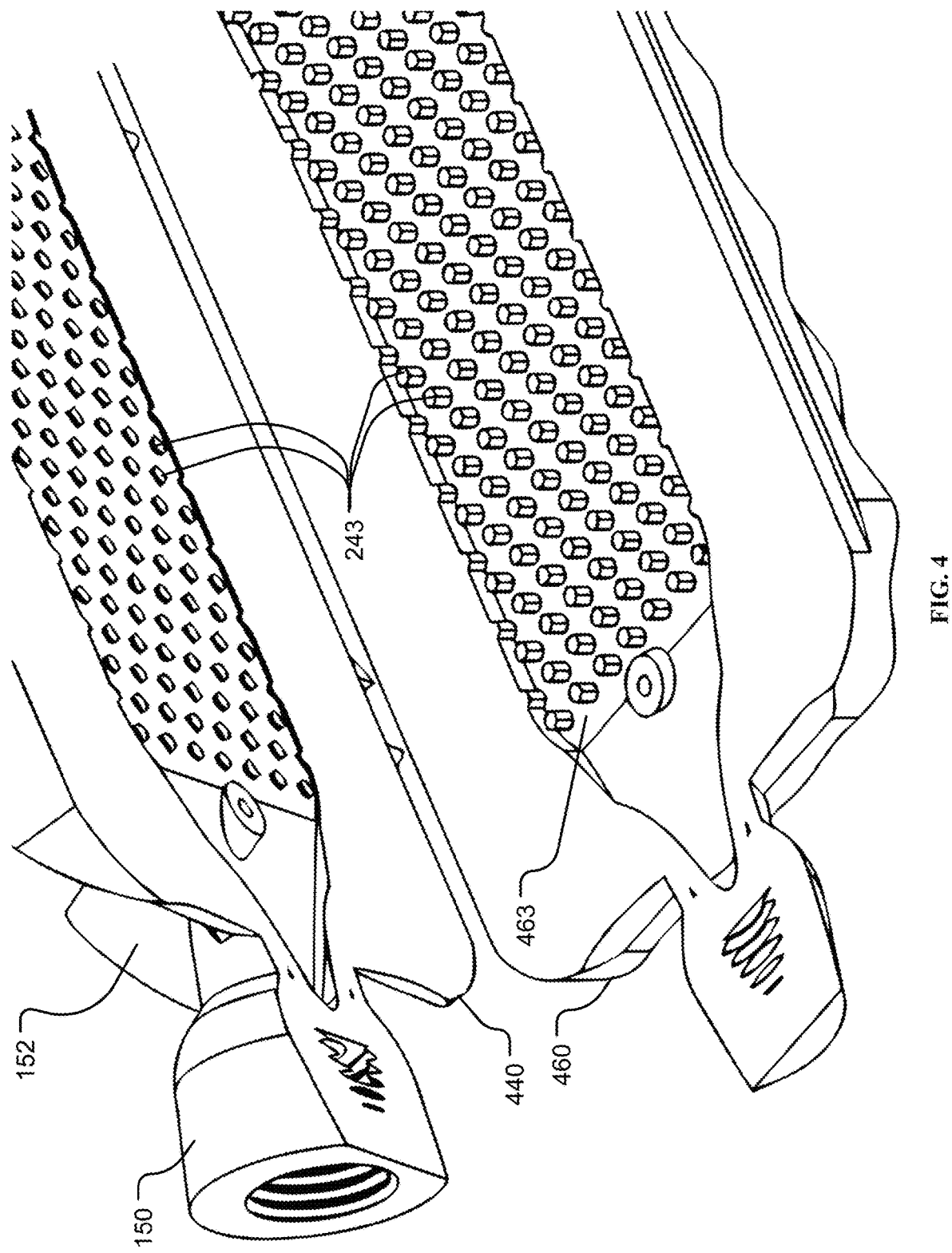
FIG. 4 shows an exploded horizontal section through the top mold side of FIG. 1 with the engineered supports visible. The orientation is the same as in FIG. 1, with the inputs to the left side of the drawing.

FIG. 4 offers another view of the thermal manifold 463 showing a pattern of engineered supports 243. This view is an imaginary horizontal "slice" through the top side 115 that cuts across the engineered supports 243 to divide the top side into an upper 440 piece and a lower 460 piece for purposes of explanation. Note that these columns, even though they appear in this figure separately on the upper 440 and lower 460 pieces, are formed as one piece internally within the manifold as it is built up layer by layer.

The engineered support columns 243 in this example have a hexagonal cross section. In another embodiment, they could have a square cross section. In yet another embodiment, they could have a triangular or pentagonal cross section. In an alternate embodiment, they could have a round or curved cross section or even a combination of curved and linear cross sections being a bit wider or thicker where they connect to the upper 440 and lower 460 pieces. Many variations are possible and will be apparent to those skilled in the art after reading this disclosure. In general, more distinct "sharper" edges on the columns produce more turbulence in the circulating thermal fluid and thereby increases the heat transfer. Alternatives to the engineered supports 243 are illustrated in FIGS. 10-11. An arrangement of interconnected trusses 1027 is shown in FIG. 10 and an arrangement of branching structures 1135 is shown in FIG. 11.

FIG. 5 shows both sides 115 and 175 of the mold opened and separated to expose the finished molded part 552, a silicone rubber watchband. The watchband in this example is intended to be mounted to the watch casing at 554 and, as part of the design, holes 551 completely penetrate the watchband. These holes 551 are formed by mating projections 532 and 562 in the mold cavity 253. There are of course a myriad of design variations for a consumer product like this that will be apparent to those skilled in the art.

Figure 6:
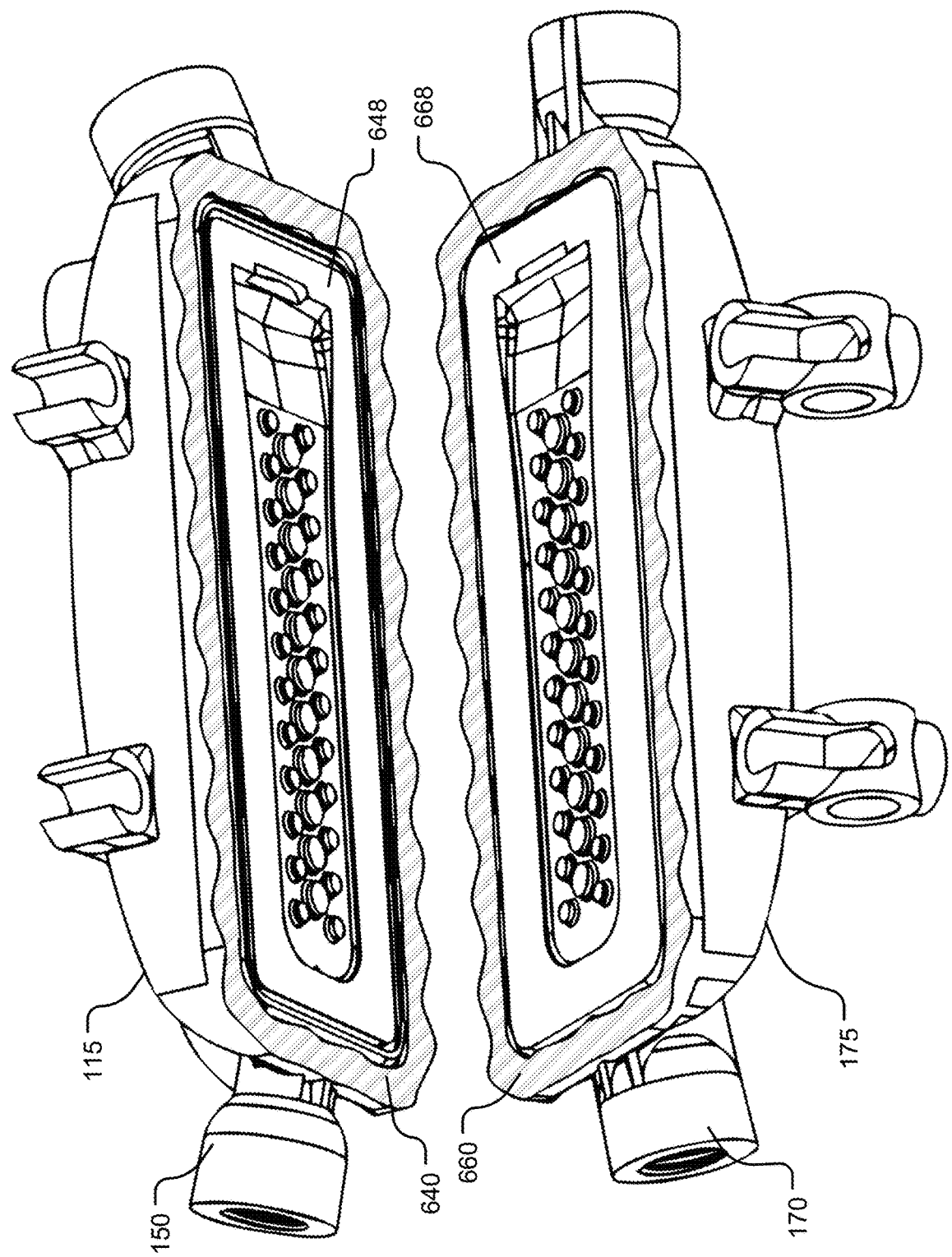
FIG. 6 shows an exploded view of FIG. 1 with emphasis on the interlocking scalloped surfaces that allow the top 115 and bottom 175 sides of the molding tool to mate together and form the assembled mold.

FIG. 6 emphasizes the mating surfaces 640 and 660 of the interlocking scalloped surfaces 165 of the mold sides designed to align the sides as well as distribute the clamping pressure evenly. Unlike conventional metal molds which are often held in alignment using pins inserted into holes drilled into the sides of the molds, the polymer materials from which 3D printed molds are made tends to deform slightly and "creep" when clamped under pressure thus affecting the final dimensions and finish of the molded part.

Using interlocking surfaces, preferably based on a repeating pattern which may be continuous, effectively mitigates creep and provides for a uniform distribution of clamping force. The latter is useful in maintaining uniform contact along the parting lines 648 and 668 in the mold to limit "flash" and hold tight part tolerances. Flash occurs when the material being molded flows outside of an injection mold cavity. This can be the result of a gap in the mating surfaces that form the parting lines around the mold cavity. Liquid silicone rubber can flash into gaps as small as 0.0002 inches.

Gaps in mating surfaces may be mitigated to a significant extent by orienting the surfaces to be parallel to the print bed and by positioning these surfaces at integral increments of the printer layer thickness. For instance, if a given printer were set to a layer thickness of 0.025 millimeters then designing a part with a mating surface that was 2.500 mm high instead of 2.530 mm high would help to avoid quantization errors in printing, provided that the part is oriented with the mating surface was parallel to the print bed. This is because the 2.500 mm height is an integral increment (2.500=100*0.025) of the 3D printer's layer thickness, whereas a height of 2.530 mm falls somewhere between 2.500 and 2.550 mm, and the printer must quantize the print head to one of these each time material is added to the layer. This quantization may not necessarily always result in the same result, thus yielding a slightly uneven surface. This may or may not be acceptable depending on the particular requirements of a particular part. Persons having skill in the art will be aware of this quantization error and consider this in the design and manufacture ("printing") of 3D printed parts.

Figure 7A:
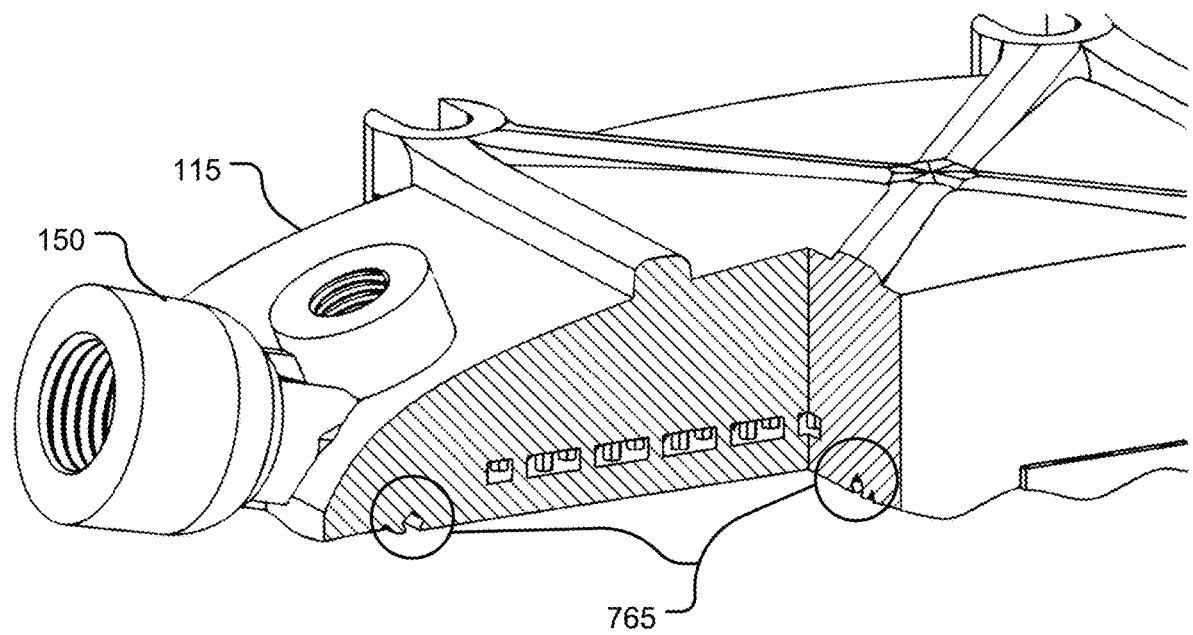
FIG. 7A shows cutaway view of the top mold side in FIG. 1 emphasizing the O-Ring groove surrounding the mating surface for this side of the mold.

FIG. 7A is a cutaway view showing the location of an O-Ring capture groove 765 which completely surrounds the mating surface that forms the parting line 648 shown in FIG. 6 on the top side 115 of the mold. In other embodiments, the O-Ring capture groove may be located on any side of a mold that contacts a mating surface forming a parting line to provide a seal for those parts of the mold. Prior to assembling the mold, an O-Ring is inserted into this groove to form a tight seal for the mold cavity.

Figure 7B:
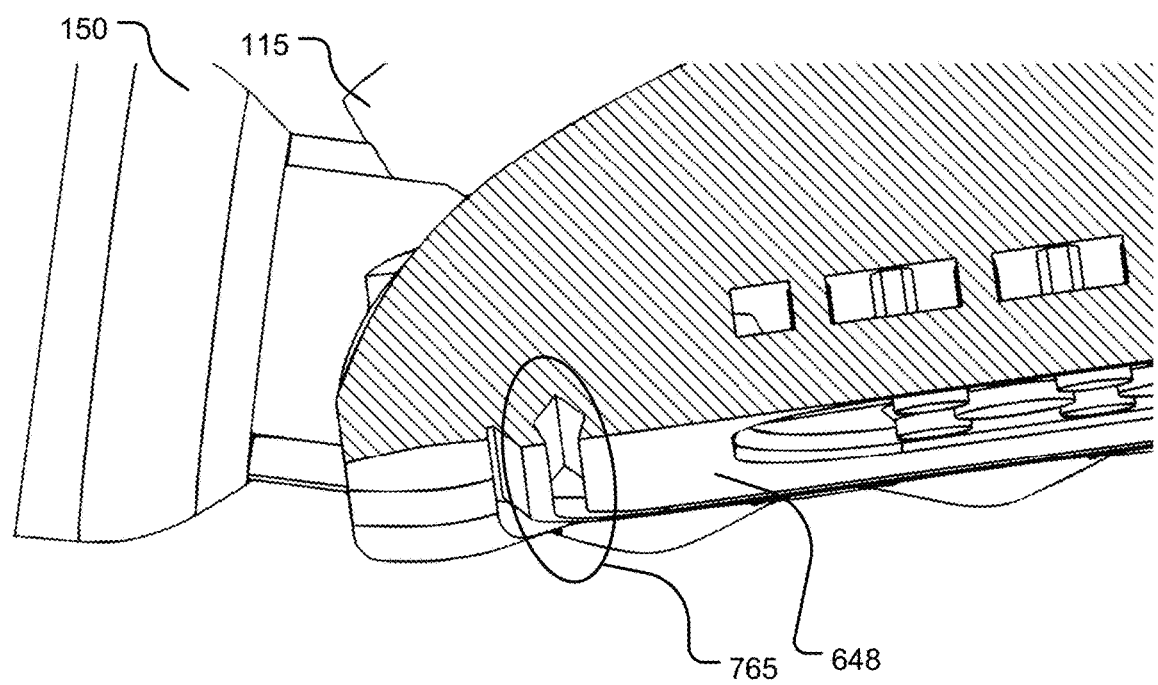
FIG. 7B shows an enlarged cutaway view of the O-Ring groove in FIG. 7A.

FIG. 7B shows an enlarged view that emphasizes the unusual shape of this groove 765 which has a smaller exposed width on the mating surface for the parting line 648 than it does internally. This allows the O-Ring groove 765 to "capture" the O-Ring, typically made of a flexible polymer material. The depth and dimensions of the O-Ring groove are designed to allow the O-Ring to be temporarily deformed and pressed into the groove while still allowing a surface of the O-Ring to project beyond the open edge of the O-Ring groove. This projected O-Ring surface will then deform to fill any gaps as clamping pressure is applied to the mold assembly. The O-Ring groove must be large enough to accommodate the O-Ring as it deforms under clamping pressure while still providing sufficient support for the O-Ring to press tightly against its mating surface on its opposing mold side.

Once in place the O-Ring retains its position regardless of the orientation of the mold side and resists moving out of the groove as the mold is clamped together. A cross sectional profile like this would be difficult if not impossible to produce using conventional machine tools and subtractive manufacturing processes. 3D printing, however, easily allows for a layer-by-layer buildup of material to form any desired cross sectional profile desired. Although shown with a pentagonal cross section 765 in this example, many variations on this 0-Ring capture groove will be apparent to those skilled in the art.

Figure 8A:
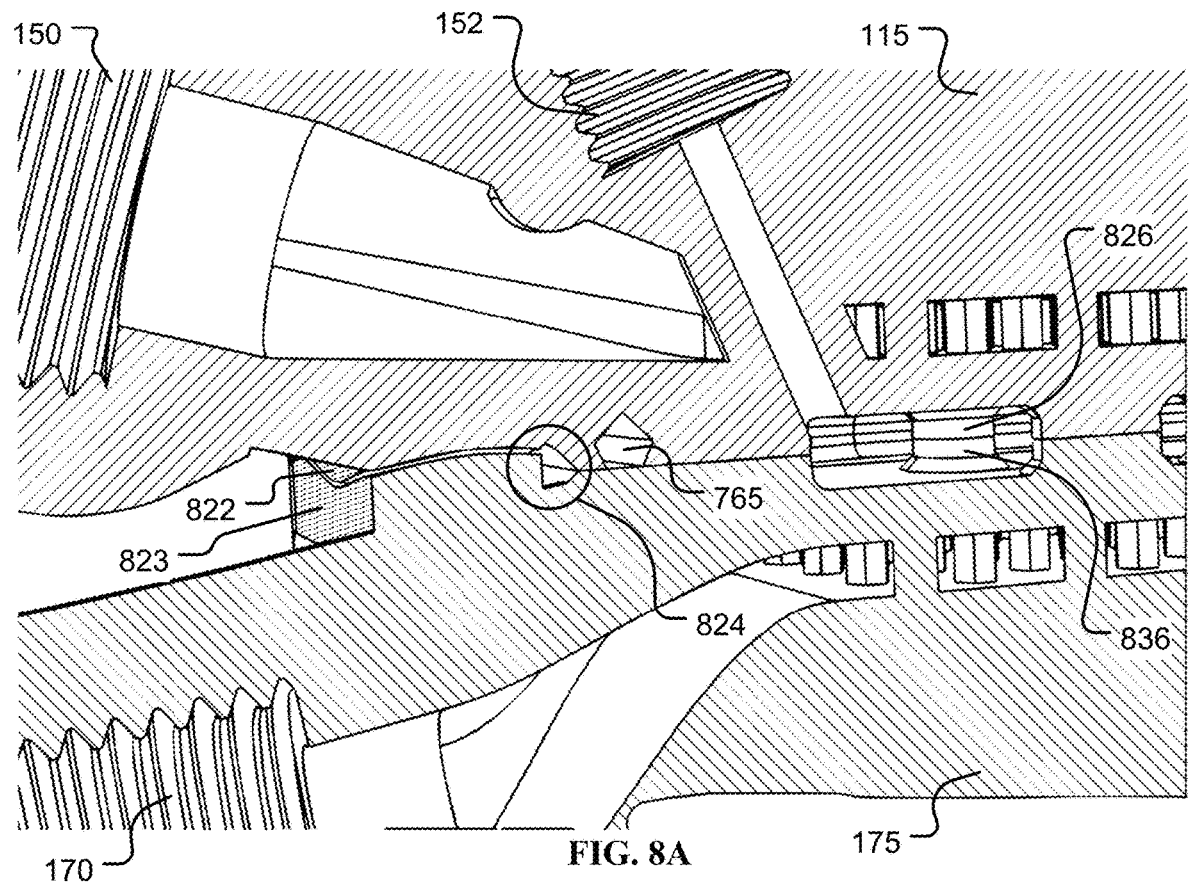
FIG. 8A shows the alignment relief notch grooves on the outer edges of the mating surfaces of the top and bottom mold sides when in an aligned position.

FIG. 8A shows another important feature that helps to ensure the proper alignment of the mold sides. This is a pair of alignment relief notch grooves 824 that are formed just outside the perimeter of the O-Ring groove 765 on the top mold side 115 in this example, with a matching alignment relief notch groove formed on the bottom side 175. FIG. 8A shows the top 115 and bottom 175 mold sides in correct alignment. Observe the exact position match between top 826 and bottom 836 mating projections in the mold cavity designed to produce a hole 557 in the completed molded part 552, a silicone rubber watchband in this example.

The alignment relief notch grooves 824 are designed with sloping sides that tend to slide into place to as clamping pressure is applied, thus correcting any small misalignments when assembling a mold. Misalignments can occur when molds are made from polymer materials used in 3D printing since polymers may deform slightly when clamped. This differs from conventional metal molds since the metal mold sides do not easily deform when clamped together.

Figure 8B:
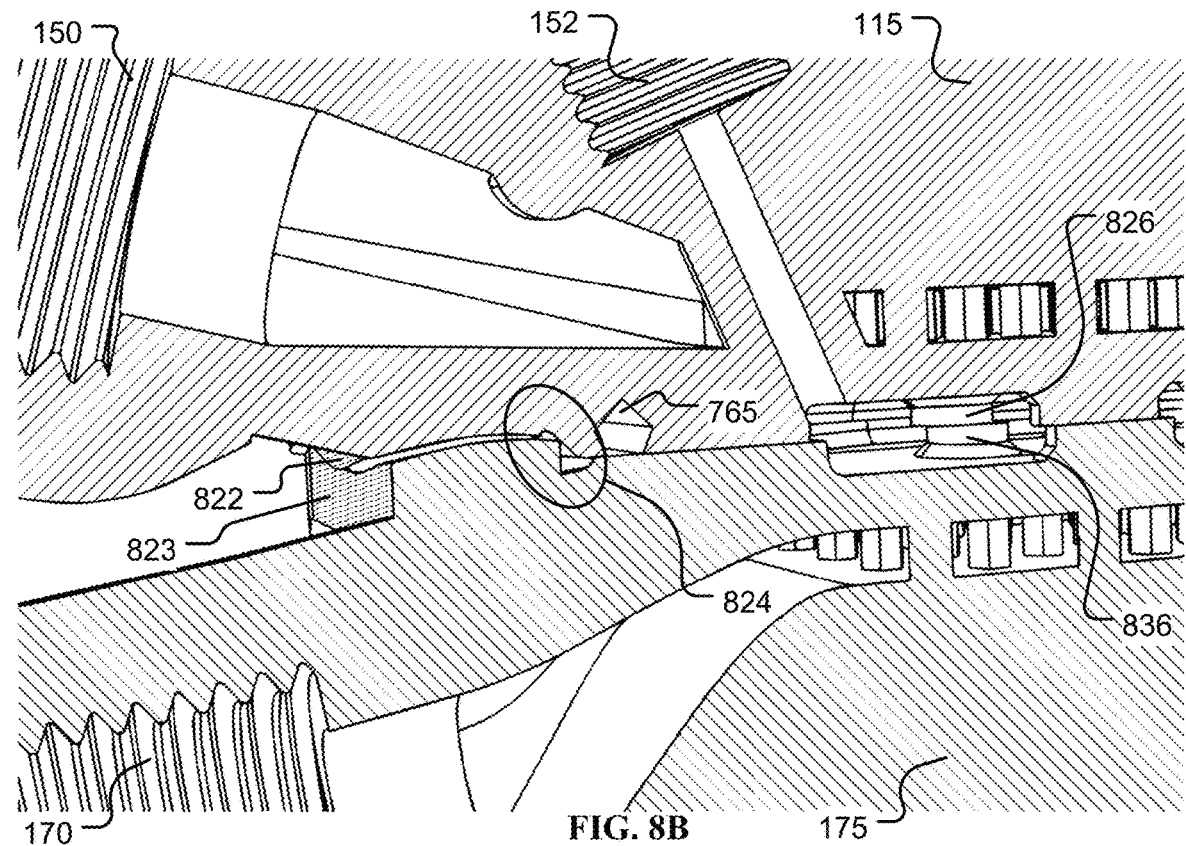
FIG. 8B shows a cutaway view of FIG. 8A with the mating surfaces slightly misaligned to illustrate the functionality of the alignment relief notch groove.

FIG. 8B illustrates how the sloping side of an alignment relief notch groove in 824 may be initially positioned if the mold sides are not perfectly aligned when clamping. For clarity and reference the top 826 and bottom 836 mating projections in the mold cavity shown in FIG. 8A are now shown in a misaligned position. Additionally, cutaway cross sections of the top 822 and bottom 823 interlocking scalloped surfaces 165 are shown properly aligned in FIG. 8A and misaligned in FIG. 8B.

Figure 8C:
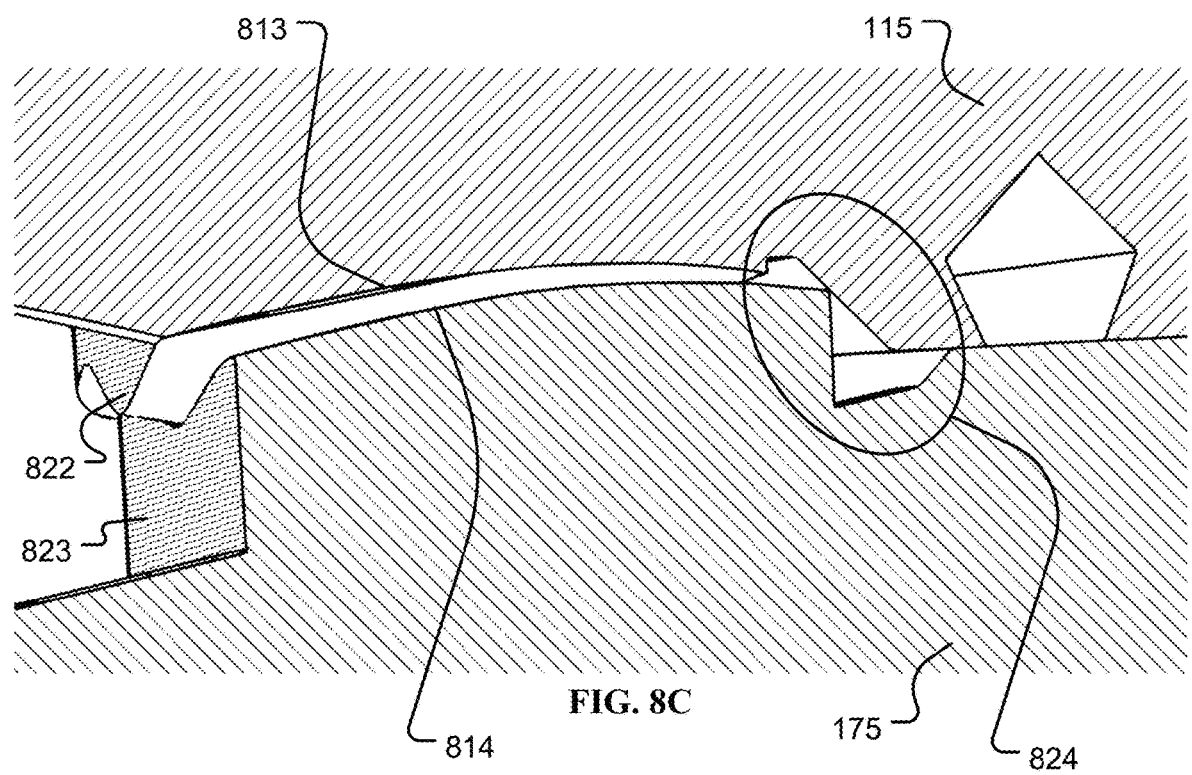
FIG. 8C shows an enlarged cutaway view of FIG. 8B emphasizing the position of the alignment relief notch.

FIG. 8C is an enlargement showing the misaligned alignment notch grooves 824 and cutaway cross sections 822 and 823 of the top and bottom interlocking scalloped surfaces. Also shown is a cutaway view of the curved surfaces 813 and 814 of the interlocking scalloped surfaces 165 that extend inward from the outer perimeter of the molding tool.

Figure 8D:
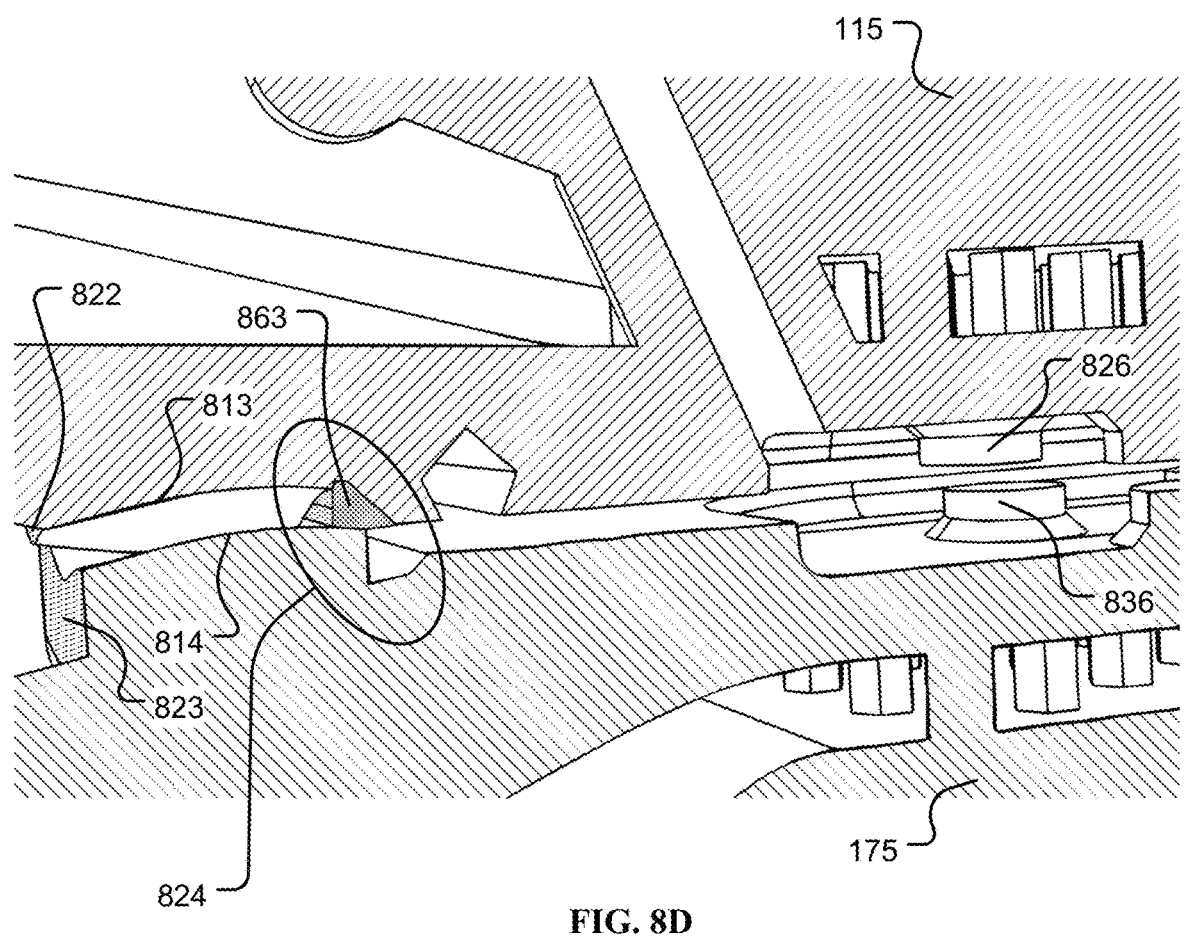
FIG. 8D shows a cutaway view of the alignment relief notch groove on the top mold side but with the notch filled in and thereby effectively eliminated. This illustrates the resulting undesirable gap in the mating faces that would occur if the alignment notch grooves were omitted.

To further clarify the need for the alignment notch grooves 824, FIG. 8D shows what would happen if the top groove were not incorporated into the top mold side. The shaded area 863 would replace and fill in the alignment notch groove with a hard 90-degree edge of the kind that would typically be used in a metal mold. Specifically, without the sloping alignment notch groove, the top side 115 of the mold would tend to sit firmly on the bottom side 175 and thereby form a gap in the mating surfaces of the mold cavity. This gap is shown in FIG. 8D between the top 826 and bottom 836 mating projections in the mold cavity designed to produce a hole 557 in the completed molded part 552, and also in the misaligned top 822 and bottom 823 cross sections of the interlocking scalloped surfaces. Alignment notch grooves are required on both sides due to the dual sinusoidal curves. Along the curves, in some segments the top mold piece captures the bottom piece, and in other segments the bottom piece captures the top piece, as the curves undulate above and below the centerline of the mold cavity.

Figure 9A:
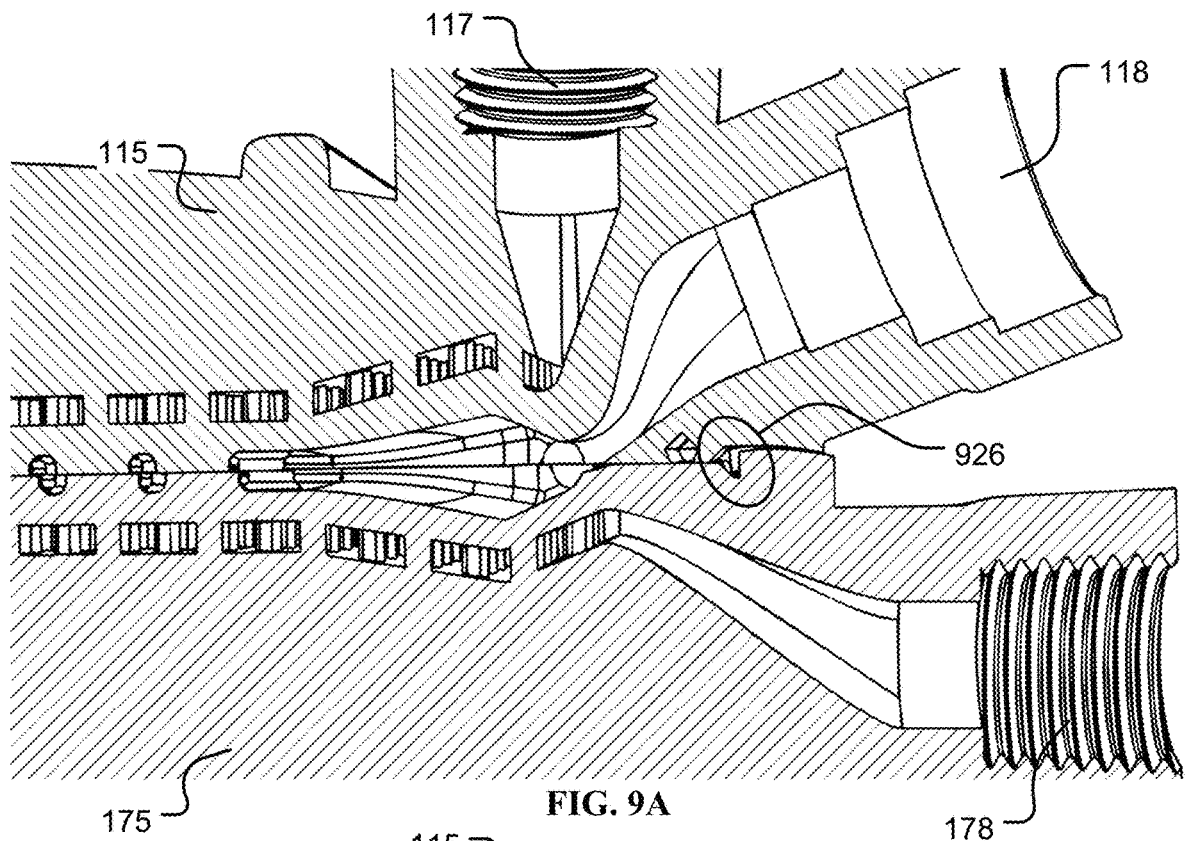
FIG. 9A shows a cutaway view of the alignment notch grooves on the exit port side of the assembly in a misaligned position to help clarify the operation of the grooves.

FIG. 9A shows a different view of the alignment notch grooves 926 as they appear at the other end of the assembled mold in a misaligned configuration, with the vent 118 and exit ports 117 and 178 shown for reference.

Figure 9B:
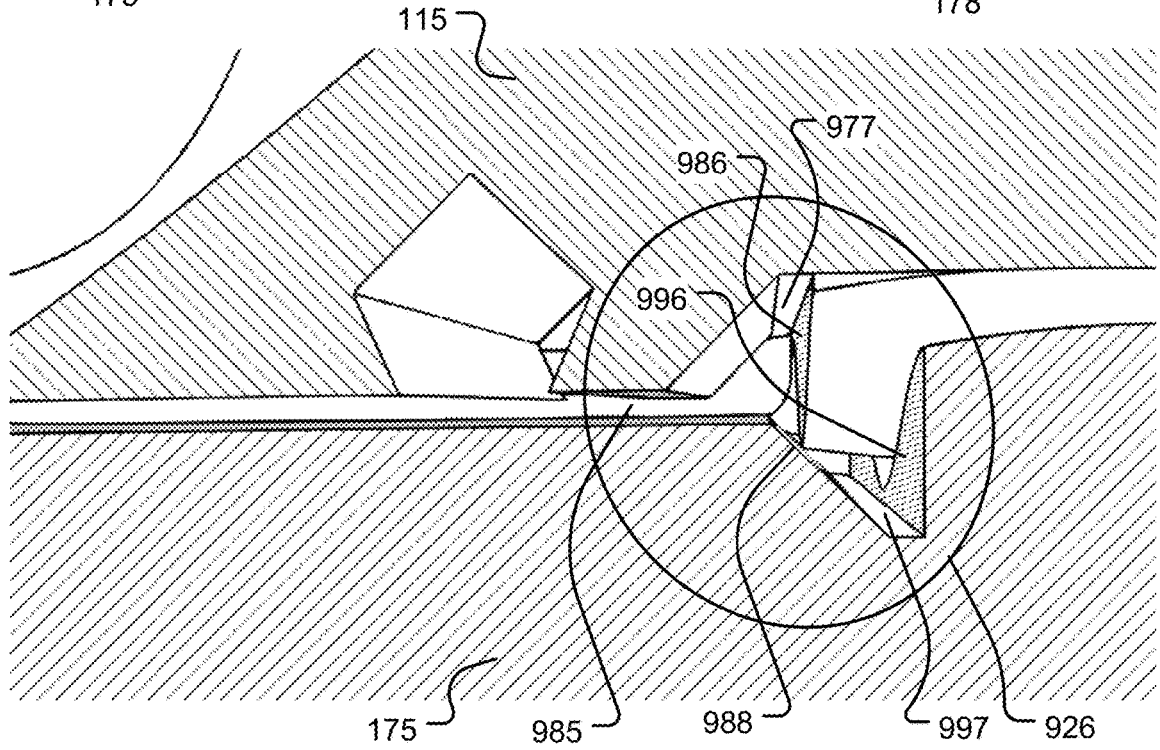
FIG. 9B shows an enlarged cutaway view of FIG. 9A.

FIG. 9B is an enlarged view of the alignment notch grooves 926 provided for additional clarification. In this view, top 986 and bottom 996 interlocking scalloped surfaces are visible and shown offset due to the misalignment being illustrated. Note the gap 985 between the top 115 and bottom 175 mold sides. The top scalloped surface 986 just touches the sloped side 988 of the bottom alignment notch groove.

When clamping pressure is applied, the polymer can deform slightly and sloping surface 988 will exert pressure on the top 986 interlocking scalloped surface, which will then tend to slide into place with the bottom interlocking scalloped surface 986 to mesh and align properly. This will close the gap 985 as the clamping pressure stabilizes at its final value.

There is also one more feature of the alignment notch grooves that is important: the floor of the grooves 977 and 997 must be positioned beyond the top or bottom of the respective interlocking scalloped surfaces so as not to interfere with those surfaces.

Figure 10A:
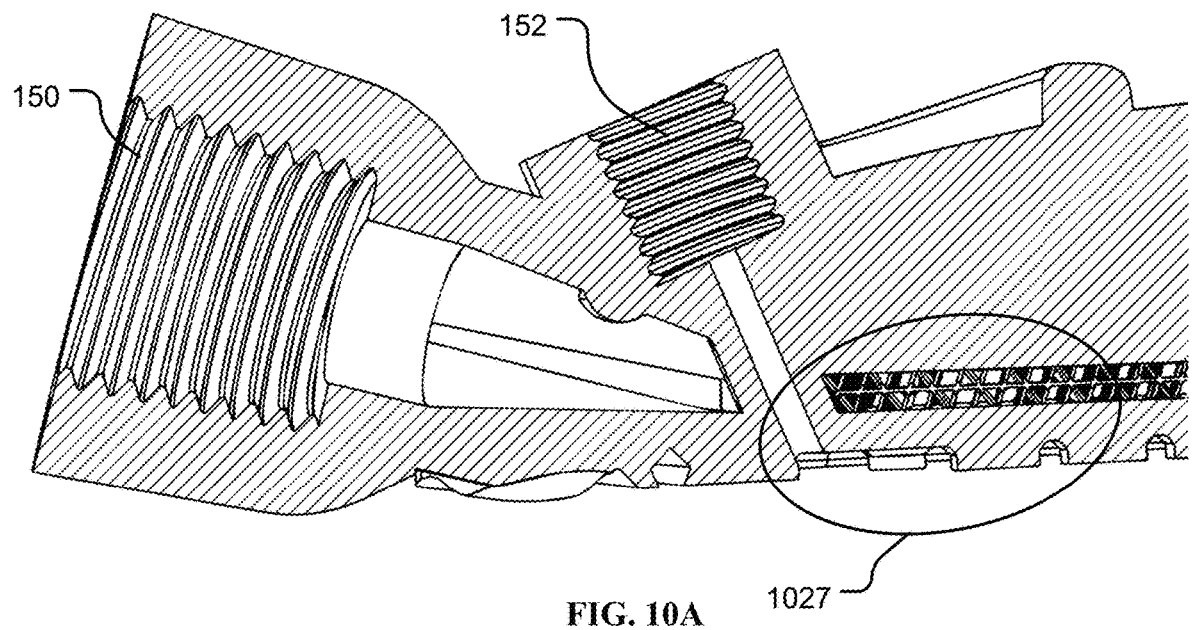
FIGS. 10A and 10B show an array of interconnected trusses as engineered supports.

FIG. 10A shows an array of interconnected trusses 1027 as an alternative to columns 243 in FIG. 1. Trusses are made of triangles and as such comprise a rigid structure in which most of the load is transferred sideways thus allowing for an open center. This allows them to have a relatively high strength to weight ratio with less material. These characteristics allow trusses to provide a practical alternative to engineered supports used to reinforce the heat transfer wall.

Figure 10B:
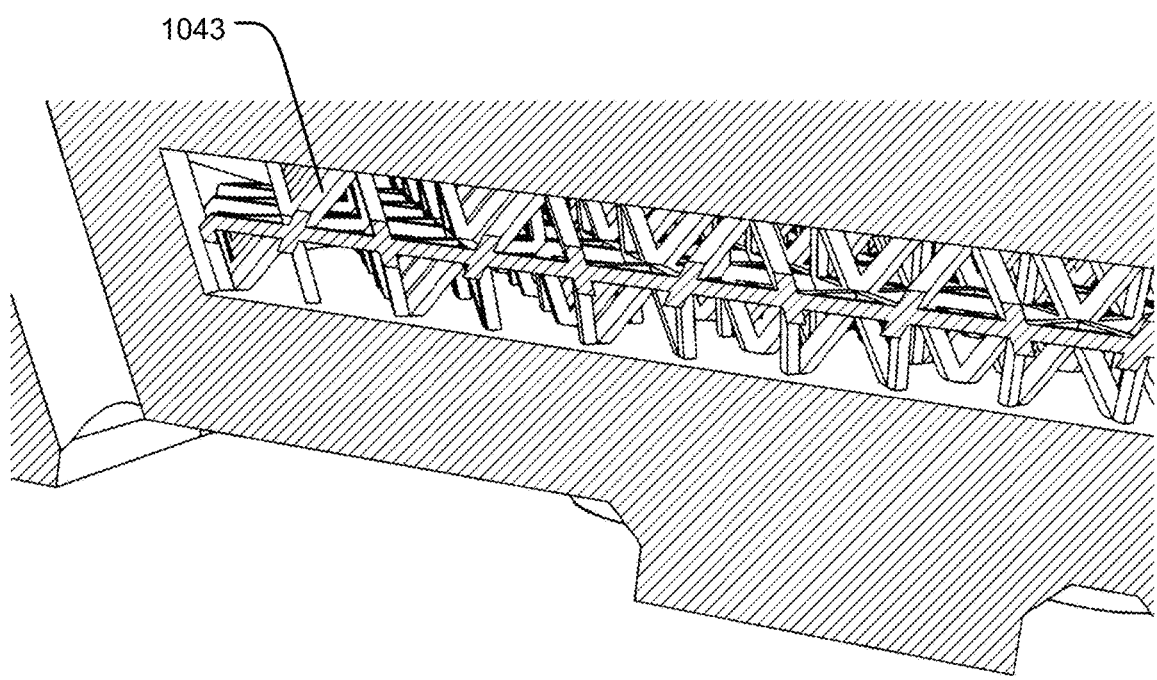

FIG. 10B shows an enlarged view of the trusses 1027 in FIG. 10A with emphasis on the detail of a triangular truss member.

Figure 11A:
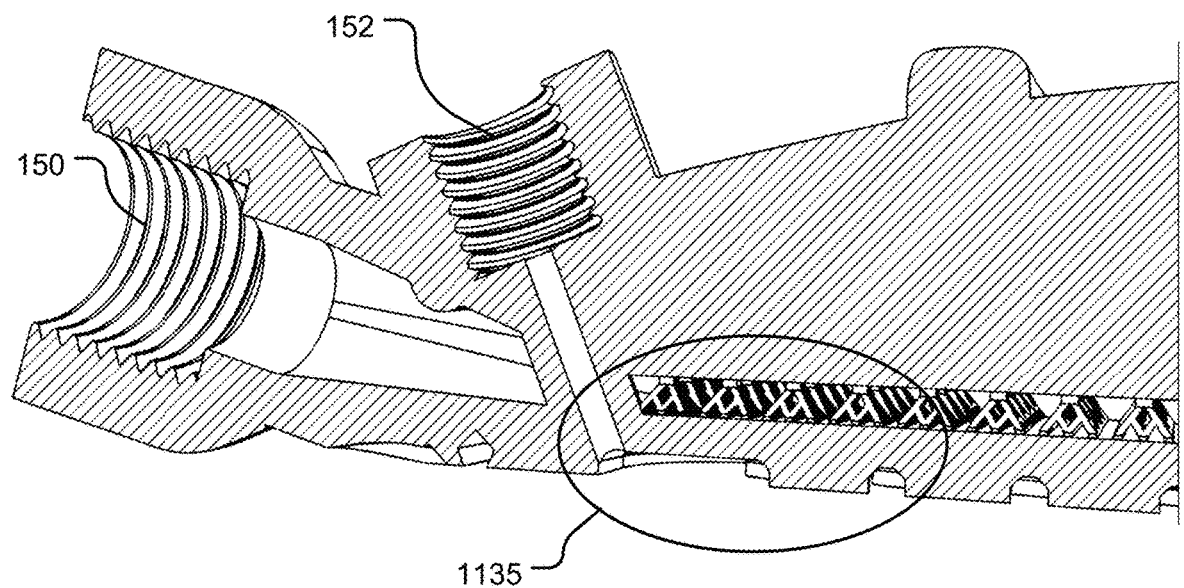
FIGS. 11A and 11B show an array of branching structures as engineered supports.

FIG. 11A shows an array of branching structures 1135 as another alternative to columns 243. Once again, these structures are composed of triangular shapes to provide structural rigidity and strength with less weight.

Figure 11B:
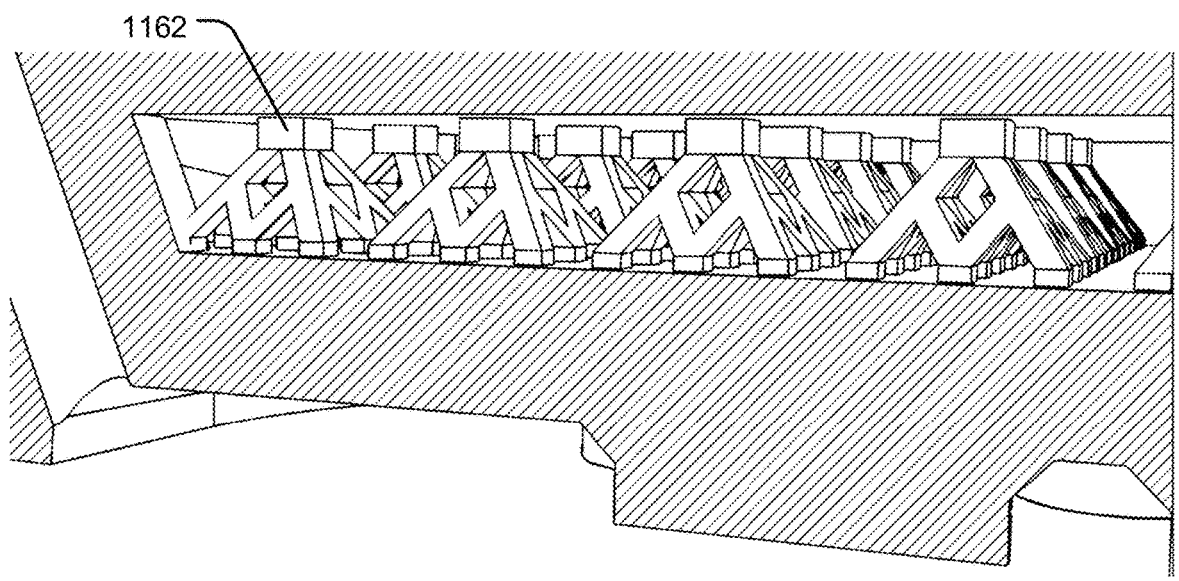

FIG. 11B shows an enlarged view of the branching structures 1135 in FIG. 11A with emphasis on the detail of a branching structure. The triangular members of the branching shape are clearly visible. The top of each branching structure is an apex in contact with the outer wall of the molding tool. The bottom of the branching structure in this example has multiple "feet" to support the heat transfer wall more uniformly by distributing the loading forces exerted from within the mold cavity as liquid silicone rubber is injected and held for curing.

In this application, we use the term "engineered supports" to refer to the engineered support columns 243, trusses 1027 and branching structures 1135.

Many other alternatives to the engineered support columns 243, trusses 1027 and branching structures 1135 illustrated above will be apparent to those skilled in the art after reading this disclosure.

Figure 12:
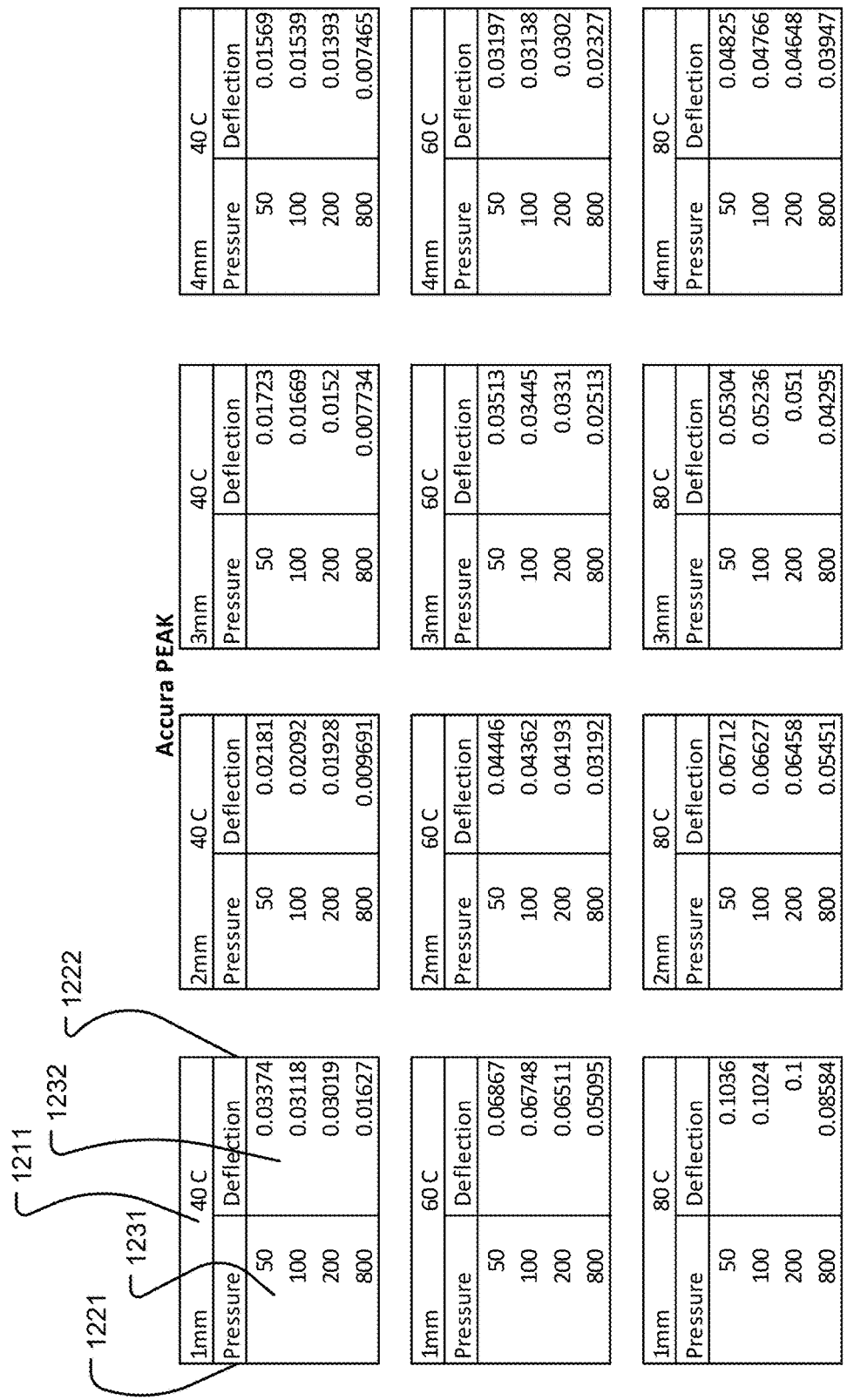

FIGS. 12-14 show the simulation results for the three different polymers used to fabricate the injection molding tool described in FIGS. 1-9: Accura® PEAK™, Accura® Bluestone™ and Carbon CE220™ resin. For each of these polymers, 12 simulations were run to estimate deflection using different combinations of wall thickness, temperature and pressure. The results of each simulation are shown in separate boxes in the tables in FIGS. 12-14. All of the simulations show that the expansion of supports, causing them to get longer, results in deflection of the heat transfer wall toward the centerline of the injection cavity. The support column expansion more than resists pressure of the injected material against the heat transfer wall.

The upper left box in FIG. 12 is representative of all simulations: In 1211, the heat transfer wall thickness is given as 1 mm and the temperature is given as 40 degrees C. In the column labeled "Pressure" 1221, the pressures are given in pounds per square inch (psi) in the following four rows 1231. The resulting estimated deflections for the given wall thickness, temperature and pressures are shown in the four rows 1232 following the column labeled "Deflection" 1222.

Because support column expansion deflects the heat transfer wall into the injection cavity, increased injection pressure reduces wall deflection by compressing the supports back towards their original size. Even under high injection pressures, the simulation produces some deflection into the mold cavity. Further explanation of the simulation appears below.

The deflection values for the simulations in the figures are within the tolerance value for fixed dimensions specified by the Rubber Manufacturers Association (RMA) as "A2 Precision" for "Molded Rubber Products" up to 10 mm thick as ±0.16 mm. Further, most of the deflection values are with the "A1 Precision" tolerance of ±0.10 mm.

Flexible Watch Band Use Case

The technology disclosed can be used to rapidly and cost effectively produce prototypes and small runs of industrial and commercial products from production grade liquid silicone rubbers that have material properties suitable for mass produced products.

In this example, the end product is a silicone rubber watchband. Many other example products could be chosen. However, this example, although it appears simple, typifies the large market in wearable consumer products that must undergo multiple design iterations based on a multitude of consumer preferences. These include shape and styling, look and feel, flexibility, durability, compatibility with human tissues and body fluids, elasticity, tear resistance, breathability and water repellency.

Further, the design-to-manufacturing cycle for consumer products often has a relatively short market window that demands rapid turnaround during the prototype phase to meet tight delivery constraints. This is one of the important benefits provided by the disclosed technology. Other benefits include eliminating the need for expensive injection molding machines that operate at higher injection pressures often exceeding 1000 to 2000 psi, and the need to undergo a much longer, expensive and more complex manufacturing cycle for a metal mold.

Of additional and particular note is that this example is based on actual injection molds built in accordance with FIGS. 1-9 and is illustrative of the application and advantages accrued through use of the disclosed technology.

The liquid silicone rubber formulation chosen for the watchband material was Dow Corning Sylgard® 184, a general-purpose silicone rubber having a durometer of 50 on the Shore A Hardness scale and a viscosity of 3900 cPs (centipoise) at room temperature. As a point of reference, honey has a viscosity of approximately 10,000 cPs (centipoise) and shortening has a viscosity of approximately 1,000,000 (one million) cPs. The Shore A Hardness scale is used for flexible mold rubbers, with a value of 50 considered medium-soft and 70 being considered medium-hard.

The injection molding tools used for this example were 3D printed based on the designs shown in FIGS. 1-9 in three different materials: Accura PEAK™, Accura® Bluestone™, and Carbon CE220™ cyanate ester resin. Some properties of these materials follow: Accura® PEAK™ (06-15 data sheet by 3D Systems) is described as a stiff plastic material for heat-resistant components. It has a heat deflection temperature of up to 153 degrees C. when processed with a thermal post cure temperature of 120 degrees C., and a Shore D hardness of 86. The heat deflection temperature indicates the temperature when the material begins to undergo plastic deformation. The Shore D hardness scale is used for hard rubbers and plastics, and a Shore D hardness of 86 is rated as extra hard, approximating the hardness of a typical hard hat used for construction work.

Accura® Bluestone™ (06-15 data sheet by 3D Systems) is a ceramic nanocomposite material having a heat deflection temperature of 267-284 degrees C. when processed with a UV plus thermal post cure at 120 degrees C., and a Shore D hardness of 92.

Carbon CE220™ cyanate ester resin is a stiff, high strength cyanate ester resin (4-3-16 data sheet by Carbon 3D) having a heat deflection temperature of 219 degrees C.

The design of the mold in all three instances was similar. However as each was printed using a different 3D printer some changes were necessary to accommodate specific printer characteristics. For instance, the printers using the Accura® PEAK™ and, Accura Bluestone™ polymers were capable of producing solid outer walls; whereas the Carbon 3D printer was limited in its ability to produce thick cross sections, so the outer walls were strengthened with fins instead of being made thick and solid.

The thickness of the heat transfer wall separating the thermal manifold from the mold cavity can range from 0.5 mm to 5 mm for typical operating conditions. With proper design and good manufacturing practices that include keeping the operating temperature below the HDT (heat deflection temperature) of the polymer used to make the molding tool, wall thicknesses of 0.1-.2 mm may be achieved. Provided that wall thickness and support column coverage are adequate, operating pressures of 50-200 psi (as measured at the pump used to pressurize the silicone rubber) may be used to achieve molded part tolerances classified as "A2 Precision" according to Rubber Manufacturers Association (RMA) standards. Higher injection pressures, as great as 500-800 psi, may be used to fill the mold cavity faster, depending on the wall thickness, the support column coverage of the heat transfer wall area and desired tolerances. As a starting point for a mold tool design using the technology disclosed, 10-20% of the surface area of the heat transfer wall should be covered by supports but this can vary depending on other design parameters. For a given pressure, if thicker walls or lower temperatures are used the support column coverage may be reduced, depending on the particular mold design and molded part tolerances desired. Conversely, if thinner walls are desired, support column coverage may be increased or operating temperatures reduced.

Deflection Simulations

The completed molded part tolerances are dependent on the deflection incurred by the heat transfer wall under specific operating conditions of temperature and pressure for a given wall thickness.

The impact of operating temperature on deflection of the heat transfer wall has been studied by simulation, but not yet studied by inducing mold failure and performing failure analysis. For the three injection molding tool polymers used above the coefficient of thermal expansion ranges from 33-98 parts per million per degree Centigrade (ppm/deg. C.). Further, if the operating temperature approaches or exceeds the HDT of the mold tool polymer the tendency of portions of the mold tool to transition from elastic deformation to plastic deformation can increase depending on the pressure exerted by the silicone rubber material being molded.

Elastic deformation is reversible and an object will return to its original shape after the stressors are removed. Plastic deformation, however, is irreversible. One way to detect it is to compare parts from successive molding cycles: if the measured dimensions exhibit a tendency to drift farther and farther apart in successive cycles, this may indicate substantial plastic deformation in the molding tool. If plastic deformation does occur, it will likely be non-uniform due to the anisotropic nature of the polymers and the 3D printing process used to manufacture the injection molding tools. If the combination of operating temperature and pressure exceeds the limits of the molding tool, catastrophic deformation may occur. This could result in extreme deformation possibly followed by rupture of the heat transfer wall or other portions of the molding tool.

Our simulation to examine the effects of temperature and injection pressure on heat transfer walls of various thicknesses was run using Autodesk® Fusion 360™ software with a simplified molding tool based on the one shown in FIGS. 1-9. The simulation modeled a portion of the heat transfer wall and its supports, covering approximately 80% of the surface area of the silicone watchband being molded. This section of the heat transfer wall was treated as a half plate static mold held in a fixed position. The injection pressure was uniformly distributed over the surface of the heat transfer wall interior to the mold cavity. The pressure inside the thermal manifold was approximately one atmosphere. Temperature was modeled as uniform throughout the portion of the mold tool being simulated. The fidelity of the simulation was limited by modeling the engineered supports as backed by a non-deforming structure. This limited the potential mode of failure to heat transfer wall collapse into the heat transfer manifold, likely due to failure of supports or due to break through between supports.

As the temperature increased, the engineered support columns expanded and exerted pressure perpendicular to the plane of the heat transfer wall, deflecting heat transfer wall sections towards the centerline of the mold cavity. This support column expansion pressure overcame the simulated pressure of the injected silicone rubber. As the simulated pressure increased, the engineered support columns compressed and the deflection into the injection cavity diminished.

The simulation was run on three different polymers for several combinations of injection pressure, temperature and wall thickness. For each polymer, the parameter values for coefficient of thermal expansion and tensile modulus were fixed.

The particular polymers modeled were Accura® PEAK™, Accura® Bluestone™ and Carbon CE220™ resin. At the present time, these represent polymers that would be suitable for 3D printed injection molds. For each of these polymers, 12 simulations were run to estimate deflection using different combinations of wall thickness, temperature and pressure. The results of each simulation are shown in separate boxes in the tables in FIGS. 12-14.

The upper left box in FIG. 12 is representative of all simulations: In 1211, the heat transfer wall thickness is given as 1 mm and the temperature is given as 40 degrees C. In the column labeled "Pressure" 1221, the pressures are given in pounds per square inch (psi) in the following four rows 1231. The resulting estimated deflections for the given wall thickness, temperature and pressures are shown in the four rows 1232 following the column labeled "Deflection" 1222.

Examining the deflection results for all three tables in FIGS. 12-14, as pressure increases, observe that the resulting deflection decreases when wall thickness and temperature are held constant. This is due to the increased tension exerted on the heat transfer wall by the pressure of the injected silicone rubber. All of the deflection values for all simulations are within the tolerance value for fixed dimensions specified by the Rubber Manufacturers Association (RMA) as "A2 Precision" for "Molded Rubber Products" up to 10 mm thick as ±0.16 mm. Further, most of the deflection values are with the "A1 Precision" tolerance of ±0.10 mm.

The thickness of the heat transfer wall affects the thermal transfer rate and thus the time required to heat the silicone rubber being molded to the desired cure temperature. An estimate of the thermal transfer rate may be obtained using this equation:

$$R = k \cdot A \cdot (T_1 - T_2)/d$$

Rate=thermal transfer rate k=thermal conductivity of the molding tool polymer

A=Area of the heated tool adjusted to compensate for the support columns $T_1$=Temperature of the thermally conductive fluid $T_2$=Temperature of the part being molded (silicon rubber)

d=Thickness of heat transfer wall

Note that the thermal transfer rate R varies inversely with the thickness of the wall but directly with the area A. It will be apparent that there is a tradeoff between the wall thickness and the number of support columns. A thinner wall would require more support columns to maintain a given deflection as compared to a thicker wall with fewer support columns. However, the increase in the number of support columns reduces the surface area of the heat transfer wall in contact with the thermal transfer fluid, thus decreasing the thermal transfer rate. Additionally, the support columns will absorb heat from the thermal transfer fluid. These factors taken together will increase the time required for the mold cavity 253 to reach the desired cure temperature.

In this implementation, a heat transfer wall thickness of 2 mm was used with hexagonal engineered support columns that covered approximately 10-20 percent of the heat transfer wall surface. If higher injection pressures were desired to allow the mold cavity to be filled faster, wall thickness could be increased up to 5 mm or more. With a thicker heat transfer wall, fewer columns may be needed for support, depending on the estimated stresses imposed by higher injection pressures. However, this may be offset by the need to maintain turbulent flow in the thermal manifold in order to heat or cool the heat transfer wall. In turn, this turbulent flow is influenced by the number and shape of the columns within the thermal manifold. Other tradeoffs may include the cost of 3D printing material and the additional time required to print additional material.

3D printing processes are much more efficient in their use of material since they are an additive process. Any unused material can usually be recaptured and reused or at least recycled. Hence, an excellent way to save on material costs in 3D printed components is to print less material by removing unnecessary features. For instance, in metal molding tools there is expense associated with every process which removes or "subtracts" material and thus, to avoid the cost of removing excess material, an entire block or billet of material is used when much less is actually required. This is not the case for 3D printing since the analogous costs are associated with "adding" material as each layer or volume is "printed." Hence, it can be both practical and less expensive to incorporate structural features in a design that add strength while reducing material requirements. An example would be to replace a solid outer mold wall with a finned outer mold wall or incorporate a truss-like structure in the outer mold wall to provide strength and support while minimizing material. This would also speed up the 3D printing process since less material would need to be printed.

Returning to aspects of the heat transfer wall, one of the differentiating qualities of 3D printed molding tool sides is that they are usually made of polymers as opposed to metal. While most metals readily conduct heat, the insulating nature of polymers and plastics in general is such that once heated or cooled to a particular temperature; the material tends to remain at that temperature much longer than a thermally conductive material such as the metal used in traditional metal molding tools. Owing to this thermal inertia, the temperature gradient throughout the heat transfer wall is relatively small. Thus, the mold cavity, by virtue of being in contact with the heat transfer wall, should tend to be more evenly heated throughout and hot spots should be minimized thereby.

The molding cycle for the Dow Corning Sylgard®184 used in this example includes an initial preheating of the mold tool and the Sylgard®184 silicone rubber to be injected to 40 degrees C., followed by injection at a pressure of 50 psi until fill completes, raising the mold temperature to 120 degrees C. for curing and holding it for 30 min., then allowing it to cool to room temperature.

The thermal transfer fluid used to heat the mold cavity 253 via the heat transfer walls in the top and bottom mold pieces in this example is silicone oil that is injected and circulated through ports 150 and 170 in FIG. 2 and returned through ports 117 and 178. The thermal transfer fluid may be maintained at a higher pressure than required to circulate the fluid in order to offset the pressure exerted on the heat transfer wall by the injection pressure of the heated silicone rubber.

The mold tool in this example is first preheated to an initial temperature of 80 degrees C. by circulating the thermal transfer fluid through the thermal manifold. The Sylgard®184 silicone rubber to be molded is preheated, pressurized and injected into the mold cavity 253. The mold cavity is then filled to the desired capacity, typically 99% to allow for a 1% expansion of the heated liquid silicone rubber and minimize "flash." Fill time depends on many factors including the injection pressure and viscosity of the heated silicone rubber.

The flow of the heated silicone rubber is then terminated and the mold cavity temperature is raised to the desired curing temperature to begin the curing cycle. Holding pressure is maintained following injection of the heated silicone rubber to help compensate for material shrinkage. Holding pressure varies and must often be determined empirically to achieve a desired finish on the molded part. When the curing cycle is complete, the mold is allowed to cool and the part is removed.

It will be appreciated that there are many variations for curing cycles that can yield similar or acceptable results. For instance, the Sylgard®184 data sheet (Dow Corning Form No. 06-1009-01) provides three recommended heat curing cycles: 45 min. at 100 degrees C., 20 min. at 125 degrees C. and 10 min. at 150 degrees C. An additional option of approximately 48 hours at room temperature is also given, but heat cure cycles are known to improve the cross linking in the final product, thus improving durability. In general, higher temperatures cure the material faster and higher pressures fill the mold cavity faster. The engineering tradeoff is that higher pressures and temperatures may subject the molding tool to plastic deformation, resulting in less accurate end products and possibly shortening the useful life of the molding tool itself. Adding additional engineered supports and thickening the heat transfer wall are possible approaches to mitigate these problems.

Particular Implementations

The technology disclosure focuses on one side of an injection mold. Of course, it can be applied to complementary sides of a two, three or four piece mold. The side described includes an injection port for injection molding. A vent port can be included or can be on an opposing or complementary side of an injection mold. The technology also applies to a side of an injection mold with inlets and outlets to a heating fluid manifold, without any injection port.

Side of an Injection Mold

In one implementation, the technology disclosed is practiced as component of an injection molding tool, a one piece side of a mold built up by additive manufacturing using a 3D printing polymer to define part of an injection cavity. The one piece side of the mold can be built up with the following features due to the additive manufacturing with a 3D printing polymer. This component includes an injection port coupled to the injection cavity and a heating fluid manifold separated from the injection cavity by a heat transfer wall. The heat transfer wall is reinforced against pressure in the injection cavity by a backing of engineered supports. The mold side further includes inlet and outlet ports coupled to the heating fluid manifold, configured to channel a thermally conductive fluid into and out of the heating fluid manifold.

Additional pieces can be combined with the ports of the side to fasten hoses or pipes carrying heating fluid, as there are many types of available fasteners other than single piece threaded connections. The heating fluid can be liquid or gaseous. Liquids can be non-compressible and can add backing force to the heat transfer wall, especially when a liquid heating fluid is under pressure or sealed in the manifold.

This technology and other implementations of the technology disclosed can include one or more of the following features and/or features described in connection with additional technology disclosed. In the interest of conciseness, the combinations of features disclosed in this application are not individually enumerated.

The engineered supports can be configured to mix and create a non-laminar flow of the thermally conductive fluid through the heating fluid manifold. In this application, "engineered" means made part of the design of the manifold.

The engineered supports reinforce the heat transfer wall. Three structures of supports are columns, trusses and branched structures. "Branched structures" are shown in FIGS. 11A-B.

The heat transfer wall is built up from a 3D additive manufacturing material that has a thermal conductivity in a range of 0.1 to 1.0 W/(m·K) (watts per meter per degrees Kelvin). With additives that increase the conductivity of the 3D additive manufacturing material, the thermal conductivity can increase into a range of 0.1 to 2.5 W/(m·K) or into a range of 0.1 to 5.0 W/(m·K).

The side of the mold can be additively built up from a 3D printing polymer, or an epoxy based photopolymer liquid resin that is hardened by stereolithography, or from cyanate ester based photopolymer liquid resin.

In a side of the mold, the heat transfer wall deflects less than 0.15 mm under an injection pressure of 200 psi at a temperature of the heat transfer wall of 80 degrees Celsius. The degree of deflection can be designed to a controlled deflection, as the engineered supports expand when heated and resist injection pressure from within the injection cavity.

With a non-compressible thermally conductive fluid sealed in the manifold or pressurized against an injection pressure, the heat transfer wall with engineered support backing deflects less than 0.15 mm under an injection pressure of 200 psi at a temperature of the heat transfer wall of 80 degrees Celsius.

The heat transfer wall thickness determines its strength and insulation effect. A heat transfer wall thickness that averages 0.75 to 1.25 mm thick across the area that separates the injection cavity from the heating fluid manifold, after excluding engineered supports from calculating the average, appears from structural analysis to be sound. Also, a heat transfer wall thickness that averages 1.25 to 2.50 mm thick or 2.50 to 4.5 mm thick across the area that separates the injection cavity from the heating fluid manifold, after excluding engineered supports from calculating the average, appears from structural analysis to be sound.

The side of the mold further includes a face adapted to fit against a complementary face of an additional side of the mold that further defines the injection cavity. This face includes a scalloped mating surface extending fully around the circumference of the injection cavity and adapted to interlock with the complementary face of the additional side. This scalloped mating service can be patterned to a parametric equation comprising one or more sinusoidal curves. Or, to one or more polynomials. It can avoid use of pins or can complement use of pins inserted into or formed as part of the one piece side of the mold.

The side of the mold further includes an alignment relief notch groove extending fully around the injection cavity.

The technology disclosed can be expressed as a method of making a side of a mold, in addition to describing the mold itself. Or, it can be expressed as a product produced by a manufacturing method.

Method of Making a Side of a Mold

Implemented as a method, the technology disclosed is useful for building a component of an injection molding tool. One method implementing the technology disclosed includes forming a side of a mold by additive manufacturing, which defines part of an injection cavity. Forming the side of the mold includes forming, by the additive manufacturing, an injection port coupled to the injection cavity, a heating fluid manifold separated from the injection cavity by a heat transfer wall, engineered supports positioned to reinforce the heat transfer wall against pressure in the injection cavity, and inlet and outlet ports coupled to the heating fluid manifold. The inlet and outlet ports are configured to channel a thermally conductive fluid into and out of the heating fluid manifold.

Additive manufacturing forms this component as a single piece. The additive manufacturing of this component proceeds as described above for the component. The method can be used to form any of the feature described above. Not all of the features will be repeated here, for the sake of brevity.

Forming additional pieces can be combined with the formed side, such as fastener parts combined with the ports to fasten hoses or pipes carrying heating fluid, as there are many types of available fasteners other than single piece threaded connections. Additional sides of the injection mold can be formed, as described above.

The engineered supports can be formed to mix and create a non-laminar flow of the thermally conductive fluid through the heating fluid manifold.

The heat transfer wall is formed from a 3D additive manufacturing material that has a thermal conductivity in a range of 0.1 to 1.0 W/(m·K). With additives that increase the conductivity of the 3D additive manufacturing material, the thermal conductivity can increase into a range of 0.1 to 2.5 W/(m·K) or into a range of 0.1 to 5.0 W/(m·K).

21. The side of the mold can be formed from a 3D printing polymer, or an epoxy based photopolymer liquid resin that is hardened by stereolithography, or from cyanate ester based photopolymer liquid resin.

In a side of the mold, the heat transfer wall can be formed to deflect less than 0.15 mm under an injection pressure of 200 psi at a temperature of the heat transfer wall of 80 degrees Celsius. The degree of deflection can be controlled, as the engineered supports expand when heated and resist injection pressure from within the injection cavity.

With a non-compressible thermally conductive fluid sealed in the manifold or pressurized against an injection pressure, the heat transfer wall with engineered support backing can be formed to deflect less than 0.15 mm under an injection pressure of 200 psi at a temperature of the heat transfer wall of 80 degrees Celsius.

The heat transfer wall thickness determines its strength and insulation effect. A heat transfer wall can be formed with a thickness that averages 0.75 to 1.25 mm across the area that separates the injection cavity from the heating fluid manifold, after excluding engineered supports from calculating the average, appears from structural analysis to be sound. Or, the heat transfer wall can be formed with a thickness that averages 1.25 to 2.50 mm or 2.50 to 4.5 mm thick across the area that separates the injection cavity from the heating fluid manifold, after excluding engineered supports from calculating the average, appears from structural analysis to be sound.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

What is claimed is:

1. A component of an injection molding tool comprising:
    a one-piece half mold built up by additive manufacturing using a 3D printing polymer, the one-piece half mold defining part of an injection cavity, the one-piece half-mold further comprising:
    an injection port coupled to the injection cavity;
    a heating fluid manifold cavity separated from the injection cavity by a heat transfer wall made of the polymer, wherein the heat transfer wall is reinforced against pressure in the injection cavity by a backing of engineered supports that are a unitary part of the one-piece half mold;
    wherein the engineered supports are configured to strengthen the heat transfer wall and create a non-laminar flow of a thermally conductive fluid through the heating fluid manifold cavity; and
    inlet and outlet ports coupled to the heating fluid manifold cavity, configured to channel the thermally conductive fluid into and out of the heating fluid manifold cavity.

2. The component of claim 1, wherein the polymer from which the heat transfer wall is built up has a thermal conductivity in a range of 0.1 to 1.0 W/(m·K).

3. The component of claim 1, wherein the polymer from which the heat transfer wall is built up has a thermal conductivity in a range of 0.1 to 5.0 W/(m·K).

4. The component of claim 1, wherein the side of the mold is built up from an epoxy based photopolymer liquid resin that is hardened by stereolithography.

5. The component of claim 1, wherein the side of the mold is built up from cyanate ester based photopolymer liquid resin.

6. The component of claim 1, wherein the engineered supports are columns.

7. The component of claim 1, wherein the engineered supports are trusses.

8. The component of claim 1, wherein the engineered supports are branching structures.

9. The component of claim 1, wherein the heat transfer wall deflects less than 0.15 mm under an injection pressure of 200 psi at a temperature of the heat transfer wall of 80 degrees Celsius.

10. The component of claim 1, wherein the heat transfer wall is an average of 0.75 to 1.25 mm thick where the heat transfer wall separates the injection cavity from the heating fluid manifold cavity, after excluding the engineered supports from calculating the average.

11. The component of claim 1, wherein the heat transfer wall is an average of 1.25 to 2.5 mm thick where the heat transfer wall separates the injection cavity from the heating fluid manifold cavity, after excluding the engineered supports from calculating the average.

12. The component of claim 1, wherein the side of the mold further comprises:
    a face adapted to fit against a complementary face of an additional side of the mold that further defines the injection cavity;
    wherein the face comprises a scalloped mating surface extending fully around a circumference of the injection cavity and adapted to interlock with the complementary face of the additional side.

13. The component of claim 1, wherein the side of the mold further comprises:
    a face adapted to fit against a complementary face of an additional side of the mold that further defines the injection cavity;
    wherein the face comprises a scalloped mating surface extending fully around a circumference of the injection cavity and adapted to interlock with the complementary face of the additional side; and
    the scalloped mating service is patterned to a parametric equation comprising one or more sinusoidal curves.

14. The component of claim 1, wherein the side of the mold further comprises:
    a face adapted to fit against a complementary face of an additional side of the mold that further defines the injection cavity, wherein the face comprises a scalloped mating surface extending fully around the circumference of the injection cavity and adapted to interlock with the complementary face of the additional side; and
    an alignment relief notch groove extending fully around the injection cavity.

* * * * *